(12) United States Patent
Hunt et al.

(10) Patent No.: US 9,413,235 B2
(45) Date of Patent: *Aug. 9, 2016

(54) SYSTEM, METHOD AND APPARATUS FOR CONTROLLING CONVERTERS USING INPUT-OUTPUT LINEARIZATION

(71) Applicants: Cirasys, Inc., Dallas, TX (US); The Board of Regents, The University of Texas System, Austin, TX (US)

(72) Inventors: Louis R. Hunt, Plano, TX (US); Robert J. Taylor, Allen, TX (US)

(73) Assignees: CIRASYS, INC., Dallas, TX (US); THE BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 172 days.

This patent is subject to a terminal disclaimer.

(21) Appl. No.: 14/462,388

(22) Filed: Aug. 18, 2014

(65) Prior Publication Data

US 2014/0354255 A1   Dec. 4, 2014

Related U.S. Application Data

(63) Continuation of application No. 12/487,242, filed on Jun. 18, 2009, now Pat. No. 8,810,221.

(51) Int. Cl.
   *H02M 3/156*   (2006.01)
(52) U.S. Cl.
   CPC ................................ *H02M 3/156* (2013.01)
(58) Field of Classification Search
   CPC . H02M 3/156; H02M 1/4225; H02M 3/1584; H02M 2003/00; H02M 3/005; H02M 3/157; H03F 2200/351; G05B 13/02; G05B 6/00
   See application file for complete search history.

(56) References Cited

U.S. PATENT DOCUMENTS 4,630,187 A   12/1986   Henze
4,677,366 A   6/1987   Wilkinson et al.
(Continued)

FOREIGN PATENT DOCUMENTS

WO   2010148066   12/2010
WO   2012091850   7/2012

OTHER PUBLICATIONS

Bodson, et al., "Differential-Geometric Methods for Control of Electric Motors," Int. J. of Robust and Nonlinear control 8, (1998), pp. 923-954.
(Continued)

*Primary Examiner* — Adolf Berhane
*Assistant Examiner* — Henry Lee, III
(74) *Attorney, Agent, or Firm* — Schultz & Associates, P.C.

(57) ABSTRACT

A system, method and apparatus for controlling boost and buck-boost converters using input-output linearization and leading-edge modulation is provided. The controller includes a summing circuit connected to the converter to create a third voltage representing a difference between the first voltage and the second voltage. A gain circuit is connected to the summing circuit to adjust the third voltage by an appropriate gain. A modulating circuit is connected to the gain circuit, the converter, the first voltage, the second voltage and the second current to create a control signal based on the first voltage, the second voltage, the adjusted third voltage, the fourth voltage and the first current. The control signal is used to control the converter. Typically, the first voltage is a converter output voltage, the second voltage is a reference voltage, the fourth voltage is a converter input voltage, and first current is a converter inductor current.

24 Claims, 8 Drawing Sheets

(56) References Cited

U.S. PATENT DOCUMENTS

| | | | |
|---|---|---|---|
| 4,929,882 | A | 5/1990 | Szepesi |
| 5,138,250 | A | 8/1992 | Capel |
| 5,311,421 | A | 5/1994 | Nomura et al. |
| 5,442,534 | A | 8/1995 | Cuk et al. |
| 5,477,132 | A | 12/1995 | Canter et al. |
| 5,708,433 | A | 1/1998 | Craven |
| 5,804,950 | A | 9/1998 | Hwang et al. |
| 5,886,586 | A | 3/1999 | Lai et al. |
| 5,920,471 | A | 7/1999 | Rajagopalan et al. |
| 5,943,224 | A | 8/1999 | Mao |
| 6,084,450 | A | 7/2000 | Smith et al. |
| 6,366,070 | B1 | 4/2002 | Cooke et al. |
| 6,407,515 | B1 | 6/2002 | Hesler et al. |
| 6,462,962 | B1 | 10/2002 | Cuk |
| 6,538,905 | B2 | 3/2003 | Greenfeld et al. |
| 6,545,887 | B2 | 4/2003 | Smedley et al. |
| 6,674,272 | B2 | 1/2004 | Hwang |
| 6,956,360 | B2 | 10/2005 | Matsuura et al. |
| 7,103,425 | B1 | 9/2006 | Marra, III et al. |
| 7,239,257 | B1 | 7/2007 | Alexander et al. |
| 7,482,794 | B2 | 1/2009 | Hunt et al. |
| 7,489,186 | B2 | 2/2009 | Segarra |
| 7,602,166 | B1 | 10/2009 | Kang |
| 7,812,586 | B2 | 10/2010 | Soldano et al. |
| 7,851,941 | B2 | 12/2010 | Walley |
| 8,130,522 | B2 | 3/2012 | Maksimovic |
| 2001/0030879 | A1 | 10/2001 | Greenfeld et al. |
| 2003/0090253 | A1 | 5/2003 | Balakrishnan |
| 2003/0199997 | A1 | 10/2003 | Gao |
| 2003/0222627 | A1 | 12/2003 | Hwang |
| 2006/0158910 | A1 | 7/2006 | Hunt et al. |
| 2007/0046105 | A1 | 3/2007 | Johnson et al. |
| 2007/0236200 | A1 | 10/2007 | Canfield et al. |
| 2010/0141225 | A1 | 6/2010 | Isham et al. |
| 2010/0164282 | A1 | 7/2010 | Tseng et al. |
| 2010/0320978 | A1 | 12/2010 | Hunt et al. |
| 2012/0146596 | A1 | 6/2012 | Lin et al. |
| 2013/0301321 | A1 | 11/2013 | Hunt |

OTHER PUBLICATIONS

Ćuk, "Modelling, Analysis, and Design of Switching Converters," Dissertation, California Institute of Technology (1977), 317 pages.

Deisch, C.W., "Simple Switching Control Method Changes Power Converter into a Current Source," IEEE Power Electronics Specialists Conference, 1978 Record, pp. 300-306.

Hunt, et al., "Design for Multi-Input Nonlinear Systems," Differential Geometric Control Theory, Birkhauser, Boston, R. W. Brockett, R. S. Millman, and H. J. Sussman, Eds., (1983), 268-298.

Hunt, L.R., et al., "Global Transformations of Nonlinear Systems," IEEE Transactions on Automatic Control, vol. 28, Mo. 1, Jan. 1983, pp. 24-31.

Sidori, A. "Nonlinear Control Systems," 3rd Ed, Springer-Verlag London Limited (1995).

Ma, D., et al., "Enabling Power-Efficient DVFS Operations in Silicon," IEEE Circuits and Systems Magazine, First Quarter, 2010, 14-30.

Meyer, et al., "Applications of Nonlinear Transformations to Automatic Flight Control," Automatica, 20 (1984), 103-107.

Meyer, G., et al., "Nonlinear System Guidance in the Presence of Transmission Zero Dynamics," NASA Technical Memorandum 4661, Jan. 1995.

Middlebrook, et al., "A General Unified Approach to Modeling Switching-Converter Power Stages," IEEE Power Electronics Specialists Conference Record, Jun. 1976, pp. 18-34.

Mitchell, D. M., "DC-DC Switching Regulator Analysis, Reprint Edition," D.M. Mitchell Consultants, McGraw-Hill, Inc. (1988).

Ridley, Ray, "11 Ways to Generate Multiple Outputs," Switching Power Magazine, 2005, 1-12.

Ridley, "A New Small-Signal Model for Current-Mode Control," Ph. D. Dissertation, Virginia Polytechnic Institute and State University (1990) 15 pages.

Sable, et al., "Elimination of the Positive Zero in Fixed Frequency Boost and Flyback Converters," Proceedings of 5th IEEE Applied Power Electronics Conference, 1990, pp. 205-211.

Sanders, "Nonlinear Control of Switching Power Converters," Ph.D. Dissertation, Massachusetts Institute of Technology (1989) 254 pages.

Shortt, Daniel J., "An Improved Switching Converter Model," Ph.D. Dissertation, Virginia Polytechnic Institute and State University (1982).

Sira-Ramirez, et al., "Exact Linearization in Switched Mode DC-to-DC Power Converters," Int. J. Control, 50 (1989), pp. 511-524.

Sira-Ramirez, "Switched Control of Bilinear Converters Via Pseudolinearization," IEEE Transactions on Circuits and Systems, vol. 36, No. 6, Jun. 1989, 8 pages.

Slotine, et al., "Applied Nonlinear Control," Prentice-Hall, Inc., Englewood Cliffs, 1991.

Su, R., "On the Linear Equivalents of Nonlinear Systems," Systems and Control Letters 2, (1982), 48-52.

Su, et al., "Linear Equivalents of Nonlinear Time-Varying Systems," International Symposium on Mathematical Theory of Networks and Systems (1981), 119-123.

Su, et al., "Robustness in Nonlinear Control," Differential Geometric Control Theory, Birkhauser, Boston, R. W. Brockett, R. S. Millman, and H. J. Sussman, Eds., (1983), 316-337.

Tang, Wei, "Average Current-Mode Control and Charge Control for PWM Converters," Ph. D. Dissertation, Virginia Polytechnic Institute and State University (1994).

Taylor, Robert J., "Feedback Linearization of Fixed Frequency PWM Converters," Ph.D. Dissertation, University of Texas at Dallas, published Nov. 2005, 173 pages.

US 9,413,235 B2

SYSTEM, METHOD AND APPARATUS FOR CONTROLLING CONVERTERS USING INPUT-OUTPUT LINEARIZATION

CROSS-REFERENCE TO RELATED APPLICATIONS

This application is a continuation of application Ser. No. 12/487,242, filed Jun. 18, 2009. The patent application identified above is incorporated herein by reference in its entirety to provide continuity of disclosure.

FIELD OF THE INVENTION

The present invention relates generally to providing modulation signals to electrical circuits and, more particularly, to a system, method and apparatus for controlling converters using input-output linearization and leading-edge modulation.

BACKGROUND OF THE INVENTION

Power converters are used to convert one form of energy to another (e.g., AC to AC, AC to DC, DC to AC, and DC to DC) thereby making it usable to the end equipment, such as computers, automobiles, electronics, telecommunications, space systems and satellites, and motors. Every application of power electronics involves some aspect of control. Converters are typically identified by their capability and/or configurations, such as, buck converters, boost converters, buck-boost converters, boost-buck converters (Ćuk), etc. For example, DC-DC converters belong to a family of converters known as "switching converters" or "switching regulators." This family of converters is the most efficient because the conversion elements switch from one state to another, rather than needlessly dissipating power during the conversion process. Essentially there is a circuit with switches and two configurations (each can be modeled as linear systems) in which the converter resides according to the switch positions. The duty ratio (d) is the ratio indicating the time in which a chosen switch is in the "on" position while the other switch is in the "off" position, and this d is considered to be the control input. Input d is usually driven by pulse-width-modulation (PWM) techniques.

Switching from one state to another and the accompanying nonlinearity of the system causes problems. State space averaging reduces the switching problems to make the system, in general, a nonlinear averaged system for a boost converter or a buck-boost converter. But, control of the system under these nonlinear effects becomes difficult when certain performance objectives must be met. For the most part linearization is done through a Taylor series expansion. Nonlinear terms of higher orders are thrown away and a linear approximation replaces the nonlinear system. This linearization method has proven effective for stabilizing control loops at a specific operating point. However, use of this method requires making several assumptions, one of them being so-called "small signal operation." This works well for asymptotic stability in the neighborhood of the operating point, but ignores large signal effects which can result in nonlinear operation of the control loop when, for example, an amplifier saturates during startup, or during transient modes, such as load or input voltage changes. Once nonlinear operation sets in, the control loop can have equilibrium points unaccounted for in the linearization.

One of the most widely used methods of pulse-width modulation is trailing-edge modulation (TEM), wherein the on-time pulse begins on the clock and terminates in accordance with a control law. Unstable zero dynamics associated with TEM in the continuous conduction mode (CCM) prevent the use of an input-output feedback linearization because it would result in an unstable operating point. The other control method is leading-edge modulation (LEM), wherein the on-time pulse begins in accordance with a control law and terminates on the clock. The difference between LEM and TEM is that in TEM the pulse-width is determined by the instantaneous control voltage $v_c$ prior to switch turn-off, whereas in LEM the pulse-width is determined by $v_c$, prior to switch turn-on.

There is, therefore, a need for a system, method and apparatus for controlling converters using input-output linearization that does not constrain stability to one operating point, but rather to a set of operating points spanning the expected range of operation during startup and transient modes of operation

SUMMARY OF INVENTION

The present invention provides a system, method and apparatus for controlling converters using input-output linearization that does not constrain stability to one operating point, but rather to a set of operating points spanning the expected range of operation during startup and transient modes of operation. In particular, the present invention uses leading edge modulation and input output linearization to compute the duty ratio of a boost converter or a buck-boost converter. The present invention can also be applied to other converter types. Moreover, the parameters in this control system are programmable, and hence the algorithm can be easily implemented on a DSP or in silicon, such as an ASIC.

Notably, the present invention provides at least four advantages compared to the dominant techniques currently in use for power converters. The combination of leading-edge modulation and input-output linearization provides a linear system instead of a nonlinear system. In addition, the "zero dynamics" becomes stable because the zeros of the linear part of the system are in the open left half plane. The present invention is also independent of stabilizing gain, as well as desired output voltage or desired output trajectory.

More specifically, the present invention provides a system that includes a boost or buck-boost converter having a first voltage at an output of the converter and a first current at an inductor within the converter, a reference voltage source having a second voltage, a fourth voltage from a voltage source providing an input voltage to the converter, and a PWM modulator/controller. The PWM modulator/controller includes a summing circuit connected to the converter and the reference voltage source to create a third voltage representing a difference between the first voltage from the output of the converter and the second voltage from the reference voltage source. A gain circuit is connected to the summing circuit to adjust the third voltage by a proportional gain or by any suitable type of controller, such as proportional (P), integral (I) or derivative (D) (or any combination of these three) controller. A modulating circuit is connected to the gain circuit, the converter to create a control signal that provides leading-edge modulation with input-output linearization based on the first voltage, the second voltage from the reference voltage source, the adjusted third voltage from the gain circuit, the fourth voltage from the voltage source or the input of the converter, and the first current from the inductor within the converter. The control signal is then used to control the converter. Whenever the converter is a boost converter, the control signal has a duty cycle defined by $$d = \frac{(RR_cC + L)y - (L - R_sR_cC)Rx_1 - RR_cCu_0 + (R + R_c)LCk(y_0 - y)}{R\left(R_cCy - \frac{LR}{R+R_c}x_1\right)}.$$

Whenever the converter is a buck-boost converter, the control signal has a duty cycle defined by $$d = \frac{(RR_cC + L)y + (L - R_cR_sC)Rx_1 + (R + R_c)LCk(y_0 - y)}{R\left(R_cCy + \frac{LR}{R+R_c}x_1 - R_cCu_0\right)}.$$

Note that the second voltage source can be integrated into the PWM modulator/controller. In addition, the PWM modulator/controller can be implemented using a digital signal processor, a field programmable gate array (FPGA) or conventional electrical circuitry. Moreover, the converter can be controlled with a proportional controller, or any suitable type of controller, such as a proportional (P), integral (I) or derivative (D) (or any combination of these three) controller, by replacing $k(y_0-y)$ in the equation defining the duty cycle d with $$\left(k_p + \frac{k_i}{s} + k_d s\right)(y_0 - y)$$

where $k_p$, $k_i$, and $k_d$ are the gains of the proportional, integral, and derivative terms of the controller.

The present invention also provides an apparatus that includes one or more electrical circuits that provide a control signal to a boost converter such that a duty cycle of the control signal is defined as $$d = \frac{(RR_cC + L)y - (L - R_sR_cC)Rx_1 - RR_cCu_0 + (R + R_c)LCk(y_0 - y)}{R\left(R_cCy - \frac{LR}{R+R_c}x_1\right)}.$$

Similarly, the present invention provides an apparatus that includes one or more electrical circuits that provide a control signal to a buck-boost converter such that a duty cycle of the control signal is defined as $$d = \frac{(RR_cC + L)y + (L - R_cR_sC)Rx_1 + (R + R_c)LCk(y_0 - y)}{R\left(R_cCy + \frac{LR}{R+R_c}x_1 - R_cCu_0\right)}.$$

In either case, the apparatus may include a summing circuit, a gain circuit, a modulating circuit and various connections. The connections include a first connection to receive a first voltage from an output of the converter, a second connection to receive a second voltage from a reference voltage source, a third connection to receive a first current from an inductor within the converter, a fourth connection to receive an input voltage from a voltage source providing an input to converter and a fifth connection to output a control signal to the converter. The summing circuit is connected to the first connection and the second connection to create a third voltage representing a difference between the first voltage from the output of the converter and the second voltage from the reference voltage source. The gain circuit is connected to the summing circuit to adjust the third voltage by a proportional gain or by any suitable type of controller, such as proportional (P), integral (I) or derivative (D) (or any combination of these three) controller. The modulating circuit is connected to the gain circuit, the second connection, the third connection, the fourth connection and the fifth connection. The modulation circuit creates a control signal that provides leading-edge modulation with input-output linearization based on the first voltage from the output of the converter, the second voltage from the reference voltage source, the adjusted third voltage from the gain circuit, the fourth voltage from the voltage source or the input of the converter, and the first current from the inductor within the converter.

Moreover, the present invention can be sold as a kit for engineers to design and implement a PWM modulated converter (boost or buck-boost). The kit may include a digital signal processor, or field programmable gate array (FPGA), and a computer program embodied on a computer readable medium for programming the digital signal processor, or FPGA, to control the PWM modulated converter. The computer program may also include one or more design tools. The digital signal processor, or FPGA, includes a summing circuit, a gain circuit, a modulating circuit and various connections. The various connections include a first connection to receive a first voltage from an output of the converter, a second connection to receive a second voltage from a reference voltage source, a third connection to receive a first current from an inductor within the converter, a fourth connection to receive the input voltage from a voltage source providing an input to converter, and a fifth connection to output a control signal to the converter. The summing circuit is connected to the first connection and the second connection to create a third voltage representing a difference between the first voltage from the output of the converter and the second voltage from the reference voltage source. The gain circuit is connected to the summing circuit to adjust the third voltage by a proportional gain or by any suitable type of controller, such as proportional (P), integral (I) or derivative (D) (or any combination of these three) controller. The modulating circuit is connected to the gain circuit, the second connection, the third connection, the fourth connection and the fifth connection. The modulation circuit creates a control signal that provides leading-edge modulation with input-output linearization based on the first voltage from the output of the converter, the second voltage from the reference voltage source, the adjusted third voltage from the gain circuit, fourth voltage from the voltage source or the input of the converter, and a first current from the inductor within the converter. Whenever the converter is a boost converter, the control signal has a duty cycle defined by $$d = \frac{(RR_cC + L)y - (L - R_sR_cC)Rx_1 - RR_cCu_0 + (R + R_c)LCk(y_0 - y)}{R\left(R_cCy - \frac{LR}{R+R_c}x_1\right)}.$$

Whenever the converter is a buck-boost converter, the control signal has a duty cycle defined by $$d = \frac{(RR_cC + L)y + (L - R_cR_sC)Rx_1 + (R + R_c)LCk(y_0 - y)}{R\left(R_cCy + \frac{LR}{R+R_c}x_1 - R_cCu_0\right)}.$$

Furthermore, the present invention provides a method for controlling a boost or buck-boost converter using a PWM modulator/controller by receiving a first voltage from an output of the converter, a second voltage from a reference voltage source, a first current from an inductor within the converter, and creating a third voltage representing a difference between the first voltage from the output of the converter and the second voltage from the reference voltage source and a fourth voltage from a voltage source or the input of the converter. The third voltage is then adjusted by a proportional gain or by any suitable type of controller, such as proportional (P), integral (I) or derivative (D) (or any combination of these three) controller. The control signal is created that provides leading-edge modulation with input-output linearization based on the first voltage from the output of the converter, the second voltage from the reference voltage source, the adjusted third voltage, the fourth voltage from the voltage source or the input of the converter, and the first current from the inductor within the converter. The converter is then controlled using the control signal created by the PWM modulator/controller. Whenever the converter is a boost converter, the control signal has a duty cycle defined by $$d = \frac{(RR_cC + L)y - (L - R_sR_cC)Rx_1 - RR_cCu_0 + (R + R_c)LCk(y_0 - y)}{R\left(R_cCy - \frac{LR}{R + R_c}x_1\right)}.$$

Whenever the converter is a buck-boost converter, the control signal has a duty cycle defined by $$d = \frac{(RR_cC + L)y + (L - R_cR_sC)Rx_1 + (R + R_c)LCk(y_0 - y)}{R\left(R_cCy + \frac{LR}{R + R_c}x_1 - R_cCu_0\right)}.$$

Note that the converter can be controlled with a proportional controller, or any suitable type of controller, such as proportional (P), integral (I) or derivative (D) (or any combination of these three) controller, by replacing $k(y_0-y)$ in the equation defining the duty cycle d with $$\left(k_p + \frac{k_i}{s} + k_d s\right)(y_0 - y)$$

where $k_p$, $k_i$, and $k_d$ are the gains of the proportional, integral, and derivative terms of the controller. Moreover, the control signal can be created using a first order system, or can be independent of a stabilizing gain, a desired output voltage or a desired output trajectory. Likewise, the present invention may include a computer program embodied within a digital signal processor, or FPGA, wherein the steps are implemented as one or more code segments.

BRIEF DESCRIPTION OF THE DRAWINGS

The above and further advantages of the invention may be better understood by referring to the following description in conjunction with the accompanying drawings.

DETAILED DESCRIPTION OF THE PREFERRED EMBODIMENT

Figure 1:
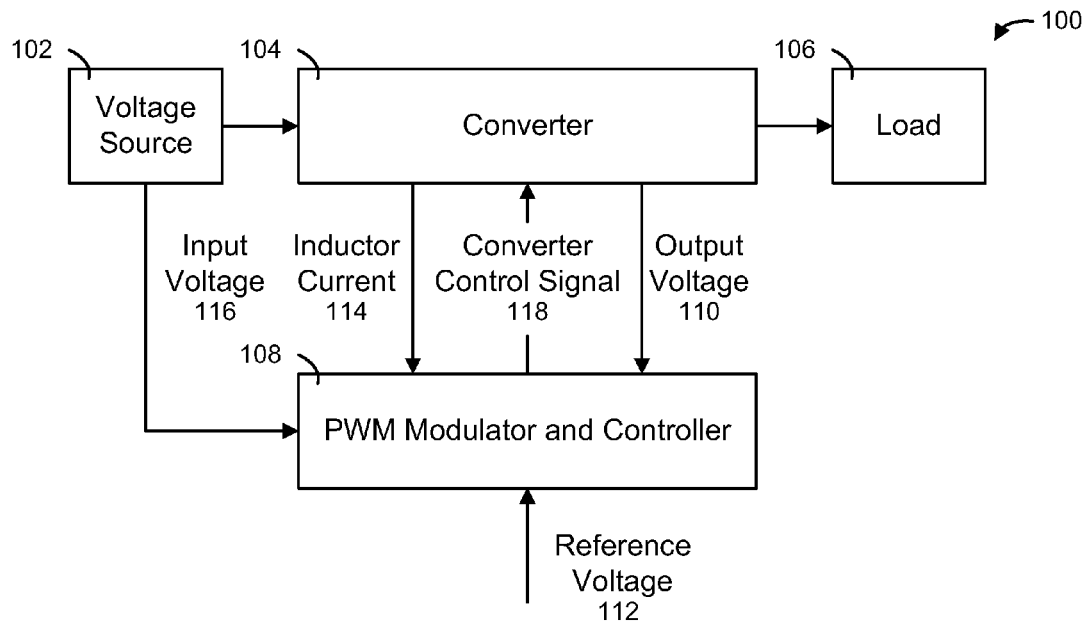
FIG. 1 is a block diagram of a system in accordance with the present invention.

In the description that follows, like parts are marked throughout the specification and figures with the same numerals, respectively. The figures are not necessarily drawn to scale and may be shown in exaggerated or generalized form in the interest of clarity and conciseness.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present invention provides a system, method and apparatus for controlling converters using input-output linearization that does not constrain stability to one operating point, but rather to a set of operating points spanning the expected range of operation during startup and transient modes of operation. In particular, the present invention uses leading-edge modulation and input-output linearization to compute the duty ratio of a boost converter or a buck-boost converter. The present invention can also be applied to other converter types. Moreover, the parameters in this control system are programmable, and hence the algorithm can be easily implemented on a DSP or in silicon, such as an ASIC.

Notably, the present invention provides at least four advantages compared to the dominant techniques currently in use for power converters. The combination of leading-edge modulation and input-output linearization provides a linear system instead of a nonlinear system. In addition, the "zero dynamics" becomes stable because the zeros of the linear part of the system are in the open left half plane. The present invention is also independent of stabilizing gain, as well as desired output voltage or desired output trajectory.

As previously described, trailing-edge modulation for boost and buck-boost converters operating in the continuous conduction mode gives rise to unstable zero dynamics where the linear part of the system about an operating point has a right half plane zero. In contrast, the present invention employs leading-edge modulation, along with some very simple design constraints, that change the zero dynamics so that the linear part of the system has only open left half plane zeros. Since the nonlinear system now possesses stable zero dynamics, input-output feedback linearization can be used. To apply this method, the actual output y is chosen as output function h(x), and y is repeatedly differentiated until the input u appears. The number of differentiations, r, is called the relative degree of the system. The present invention has a relative degree r=1. The linearizing transformation for d is solved and used for the control input. This transformation is local in nature, but it can be applied in a neighborhood of any state space operating point in DC-DC conversion.

It is desirable to choose any operating point for the nonlinear system. This operating point can be made locally asymptotically stable by the above process if a gain k is chosen to be positive. The gain k does not have to be adjusted for each operating point, i.e., no gain scheduling is required. However, the reference input will have to be walked up, which is typical of soft-start operation, to insure convergence to the operating point. Note that Proportional (P), Integral (I), Derivative (D), Proportional-Integral (PI), and Proportional-Integral-Derivative (PID) control loops can be added for robustness.

Now referring to FIG. 1, a block diagram of a system 100 in accordance with the present invention is shown. The system includes a power source (voltage) 102 connected to a converter 104 that provides power to a load 106. The converter 104 is either a boost converter or a buck-boost converter. The converter 104 is also connected to the PWM modulator/controller 108. The PWM modulator/controller 108 receives a first voltage 110 from an output of the converter 104, a second voltage (reference voltage) 112 from a voltage reference source (not shown), a first current 114 from an inductor within the converter, and a fourth voltage 116 from the voltage source 102 (i.e., the input voltage to the converter 104). A summing circuit within the PWM modulator and controller 108 creates a third voltage representing the difference between the first voltage 110 from the output of the converter 104 and the second voltage 112 from the reference voltage source. Note that the source of the second voltage 112 (voltage reference source) can be integrated within or external to the PWM modulator/controller 108. The PWM modulator/controller 108 uses the first voltage 110, the second voltage 112, the first current 114 and the fourth voltage 116 to generate a control signal 118 that is used to control the converter 104. The details of how the PWM modulator/controller 108 generates the control signal 118 will be described in more detail below. In addition, the PWM modulator/controller 108 can be implemented using a digital signal processor, an FPGA, or conventional electrical circuitry.

Figure 2:
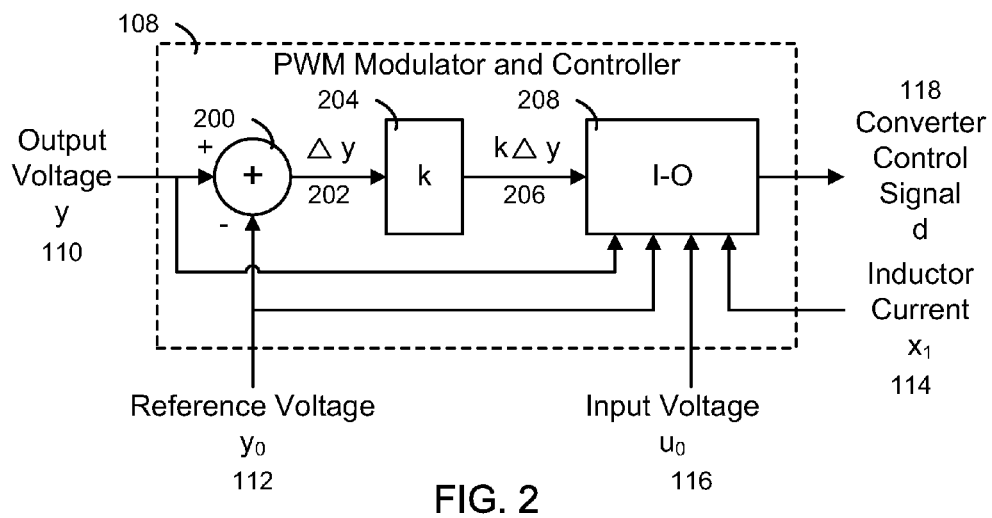
FIG. 2 is a block diagram of a modulator/controller in accordance with the present invention.

Referring now to FIGS. 1 and 2, a block diagram of a modulator/controller 108 in accordance with the present invention is shown. The modulator/controller 108 includes a summing circuit 200, a gain circuit 204, a modulating circuit 208 and various connections. The connections include a first connection to receive a first voltage (output voltage (y)) 110 from the converter 104, a second connection to receive a second voltage (reference voltage ($y_0$)) 112 from a reference voltage source (not shown), a third connection to receive a first current (inductor current ($x_1$)) 114 from the converter 104, a fourth connection to receive an input voltage ($u_0$) 116 from the voltage source 102 (i.e., the input voltage to the converter 104), and a fifth connection to output a control signal (d) 118 to the converter 104. The summing circuit 200 is connected to the first connection and the second connection to create a third voltage ($\Delta y$) 202 representing a difference between the first voltage (y) 110 and the second voltage ($y_0$) 112. The gain circuit 204 is connected to the summing circuit 200 to adjust the third voltage ($\Delta y$) 202 by a proportional gain (k), or by any suitable controller, such as proportional (P), integral (I) or derivative (D) (or any combination of these three) controller. The modulating circuit 208 is connected to the gain circuit 204, the second connection, the third connection, the fourth connection and the fifth connection. The modulation circuit 208 creates a control signal (d) 118 that provides leading-edge modulation with input-output linearization based on the first voltage (y) 110, the second voltage ($y_0$) 112, the adjusted third voltage ($k\Delta y$) 206, the first current ($x_1$) 114 and the fourth voltage ($u_0$) 116. Whenever the converter 104 is a boost converter, the control signal (d) 118 has a duty cycle defined by $$d = \frac{(RR_cC+L)y - (L-R_sR_cC)Rx_1 - RR_cCu_0 + (R+R_c)LCk(y_0-y)}{R\left(R_cCy - \frac{LR}{R+R_c}x_1\right)}.$$

Whenever the converter 104 is a buck-boost converter, the control signal (d) 118 has a duty cycle defined by $$d = \frac{(RR_cC+L)y + (L-R_cR_sC)Rx_1 + (R+R_c)LCk(y_0-y)}{R\left(R_cCy + \frac{LR}{R+R_c}x_1 - R_cCu_0\right)}.$$

The present invention also provides an apparatus having one or more electrical circuits that provide a control signal 118 to a boost converter such that a duty cycle of the control signal is defined as $$d = \frac{(RR_cC+L)y - (L-R_sR_cC)Rx_1 - RR_cCu_0 + (R+R_c)LCk(y_0-y)}{R\left(R_cCy - \frac{LR}{R+R_c}x_1\right)}.$$

Similarly, the present invention provides an apparatus having one or more electrical circuits that provide a control signal 118 to a buck-boost converter such that a duty cycle of the control signal is defined as $$d = \frac{(RR_cC+L)y + (L-R_cR_sC)Rx_1 + (R+R_c)LCk(y_0-y)}{R\left(R_cCy + \frac{LR}{R+R_c}x_1 - R_cCu_0\right)}.$$

In either case, the apparatus may include a summing circuit, a gain circuit, a modulating circuit and various connections. The connections include a first connection to receive a first voltage (y) 110 from the converter 104, a second connection to receive a second voltage ($y_0$) 112 from a reference voltage source, a third connection to receive a first current ($x_1$) 114 from the converter 104, a fourth connection to receive a fourth voltage ($u_0$) 116 from the voltage source 102 (i.e., the input voltage to the converter 104), and a fifth connection to output a control signal (d) 118 to the converter 104. The summing circuit 200 is connected to the first connection and the second connection to create a third voltage ($\Delta y$) 202 representing a difference between the first voltage (y) 110 and the second voltage ($y_0$) 112. The gain circuit 204 is connected to the summing circuit 200 to adjust the third voltage (Δy) 202 by a proportional gain (k), or by any suitable controller, such as proportional (P), integral (I) or derivative (D) (or any combination of these three) controller. The modulating circuit 208 is connected to the gain circuit 204, the second connection, the third connection, the fourth connection and the fifth connection. The modulation circuit 208 creates a control signal (d) that provides leading-edge modulation with input-output linearization based on the first voltage (y) 110 from the output of the converter 104, the second voltage ($y_0$) 112 from the reference voltage source, the adjusted third voltage (kΔy) 206 from the gain circuit 204, the first current ($x_1$) 114 from the inductor within the converter 104 and the fourth voltage ($u_0$) 116 from the voltage source 102 (i.e., the input voltage to the converter 104).

The present invention can be sold as a kit for engineers to design and implement a PWM modulated converter (boost or buck-boost). The kit may include a digital signal processor, or FPGA, and a computer program embodied on a computer readable medium for programming the digital signal processor, or FPGA, to control the PWM modulated converter. The computer program may also include one or more design tools. The digital signal processor, or FPGA, includes a summing circuit 200, a gain circuit 204, a modulating circuit 208 and various connections. The connections include a first connection to receive a first voltage 110, a second connection to receive a second voltage 112, a third connection to receive a first current 114, a fourth connection to receive an input voltage 116, and a fifth connection to output a control signal 118. The summing circuit 200 is connected to the first connection and the second connection to create a third voltage (Δy) 202 representing a difference between the first voltage and the second voltage. The gain circuit 204 is connected to the summing circuit 200 to adjust the third voltage (Δy) 202 by a proportional gain (k) or by any suitable controller, such as proportional (P), integral (I) or derivative (D) (or any combination of these three) controller. The modulating circuit 208 is connected to the gain circuit 204, the second connection, the third connection, the fourth connection and the fifth connection. The modulation circuit 208 creates a control signal 118 that provides leading-edge modulation with input-output linearization based on the first voltage (y) 110, the second voltage ($y_0$) 112, the adjusted third voltage (kΔy) 206, the first current ($x_1$) 114 and the input voltage ($u_0$) 116. Whenever the converter 104 is a boost converter, the control signal (d) 118 has a duty cycle defined by $$d = \frac{(RR_cC+L)y - (L-R_sR_cC)Rx_1 - RR_cCu_0 + (R+R_c)LCk(y_0-y)}{R\left(R_cCy - \frac{LR}{R+R_c}x_1\right)}.$$

Whenever the converter 104 is a buck-boost converter, the control signal (d) 118 has a duty cycle defined by $$d = \frac{(RR_cC+L)y + (L-R_cR_sC)Rx_1 + (R+R_c)LCk(y_0-y)}{R\left(R_cCy + \frac{LR}{R+R_c}x_1 - R_cCu_0\right)}.$$

As implemented in the system of FIG. 1, the first voltage 110 is an output voltage from the converter 104, the second voltage 112 is a reference voltage, the first current 114 is an inductor current from the converter 104 and the fourth voltage 116 is the voltage provided by the voltage source 102 as the input voltage of the converter 104.

Figure 3A:
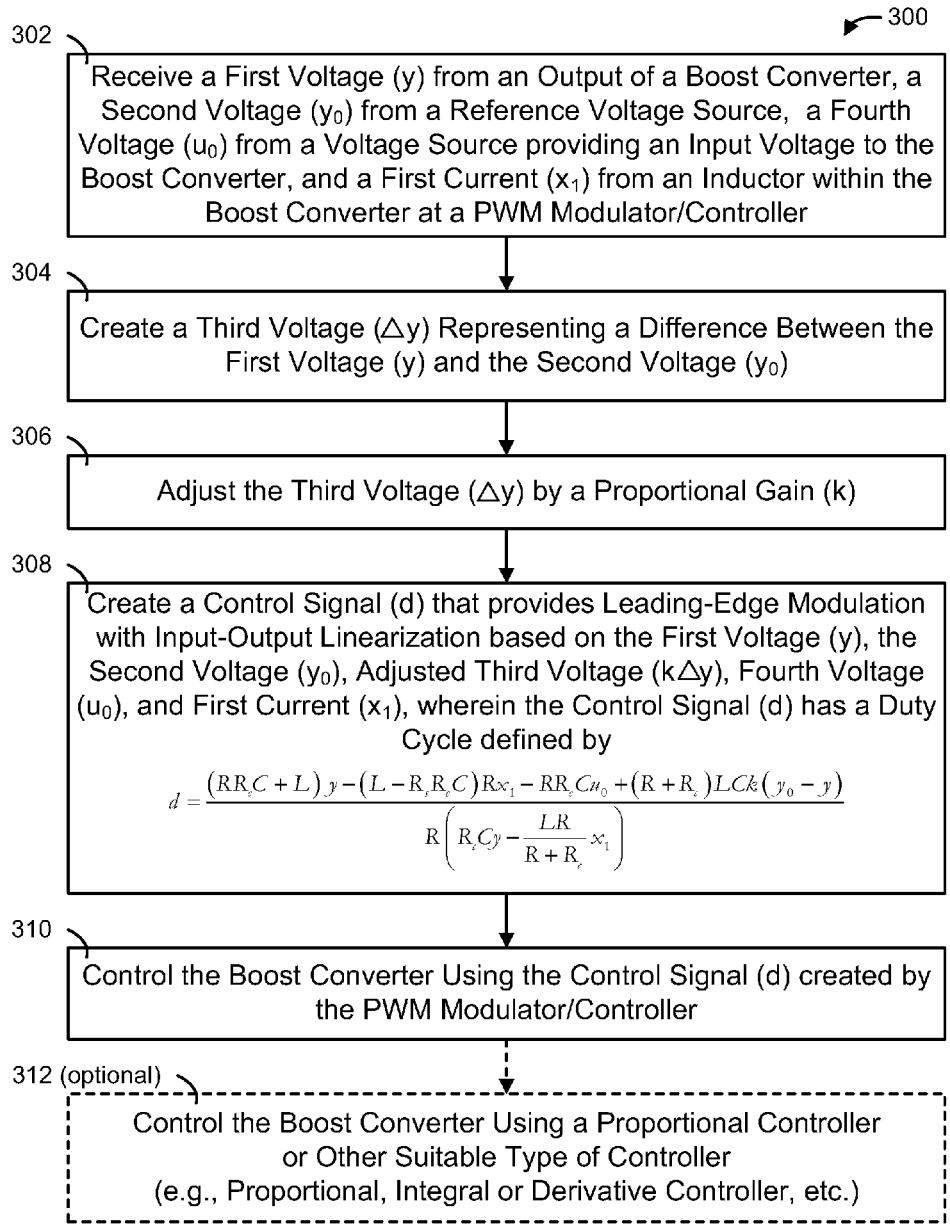
FIG. 3A is a flow chart of a method for controlling a boost converter using a PWM modulator/controller in accordance with the present invention.

Now referring to FIG. 3A, a flow chart 300 of a control method for a boost converter in accordance with the present invention is shown. The boost converter is controlled by receiving a first voltage (y) from an output of a boost converter, a second voltage ($y_0$) from a reference voltage source, a first current ($x_1$) from an inductor within the boost converter and a fourth voltage ($u_0$) from the input of the converter at a PWM modulator/controller in block 302. A third voltage (Δy) is created representing a difference between the first voltage (y) and the second voltage ($y_0$) in block 304. The third voltage ($y_0$) is adjusted by a proportional gain (k) or any suitable type of controller, such as proportional (P), integral (I) or derivative (D) (or any combination of these three) by replacing k($y_0$-y) in the equation defining the duty cycle d with $$\left(k_p + \frac{k_i}{s} + k_d s\right)(y_0 - y)$$

where $k_p$, $k_i$, and $k_d$ are the gains of the proportional, integral, and derivative terms of the controller in block 306. If $k_i$ and $k_d$ are both zero, then the controller reduces to a proportional controller. If only $k_d$ is zero, then the controller reduces to a proportional-integral (PI) controller. The control signal (d) is created in block 308 that provides leading-edge modulation with input-output linearization based on the first voltage (y), the second voltage ($y_0$), the adjusted third voltage (kΔy), the first current ($x_1$) and the fourth voltage ($u_0$), wherein the control signal (d) has a duty cycle defined by $$d = \frac{(RR_cC+L)y - (L-R_sR_cC)Rx_1 - RR_cCu_0 + (R+R_c)LCk(y_0-y)}{R\left(R_cCy - \frac{LR}{R+R_c}x_1\right)}.$$

The boost converter is then controlled using the control signal (d) created by the PWM modulator/controller in block 310. In an optional embodiment, the boost converter is controlled in block 312 using a proportional controller, or any suitable type of controller, such as proportional (P), integral (I) or derivative (D) (or any combination of these three) by replacing k($y_0$-y) in the equation defining the duty cycle d with $$\left(k_p + \frac{k_i}{s} + k_d s\right)(y_0 - y)$$

where $k_p$, $k_i$, and $k_d$ are the gains of the proportional, integral, and derivative terms of the controller. If $k_i$ and $k_d$ are both zero, then the controller reduces to a proportional controller. If only $k_d$ is zero, then the controller reduces to a proportional-integral (PI) controller. Note that the control signal can be created using a first order system, or can be independent of a stabilizing gain, a desired output voltage or a desired output trajectory. Likewise, the present invention may include a computer program embodied within a digital signal processor, or FPGA, wherein the steps are implemented as one or more code segments.

Figure 3B:
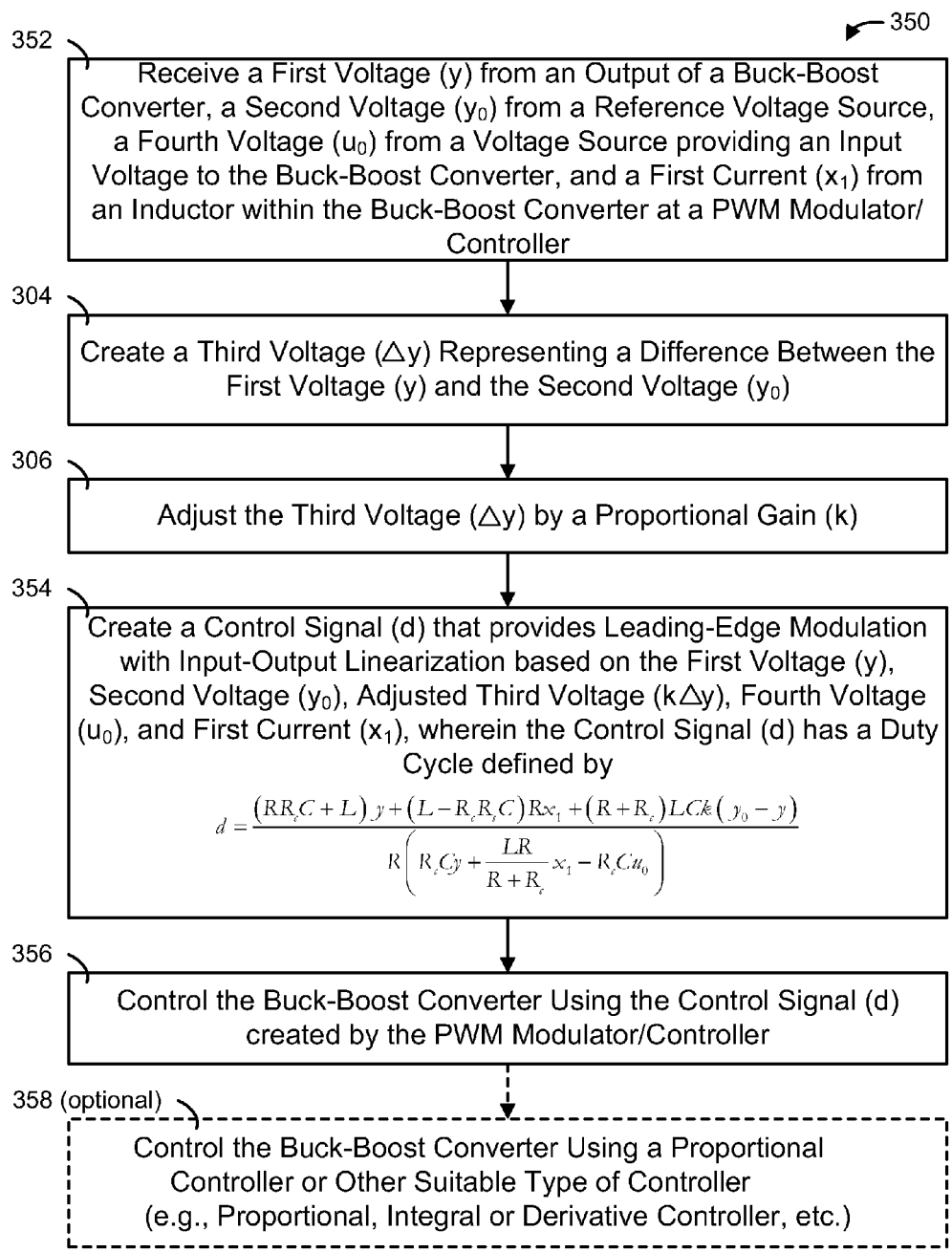
FIG. 3B is a flow chart of a method for controlling a buck-boost converter using a PWM modulator/controller in accordance with the present invention.

Now referring to FIG. 3B, a flow chart 350 of a control method for a buck-boost converter in accordance with the present invention is shown. The buck-boost converter is controlled by receiving a first voltage (y) from an output of a buck-boost converter, a second voltage ($y_0$) from a reference voltage source, a first current ($x_1$) from an inductor within the buck-boost converter and a fourth voltage ($u_0$) from voltage source providing an input to the buck-boost converter at a PWM modulator/controller in block 352. A third voltage ($\Delta y$) is created representing a difference between the first voltage (y) and the second voltage ($y_0$) in block 304. The third voltage ($y_0$) is adjusted by a proportional gain (k), or any suitable type of controller, such as a proportional (P), integral (I) or derivative (D) (or any combination of these three) controller, by replacing $k(y_0-y)$ in the equation defining the duty cycle d with $$\left(k_p + \frac{k_i}{s} + k_d s\right)(y_0 - y)$$

where $k_p$, $k_i$, and $k_d$ are the gains of the proportional, integral, and derivative terms of the controller in block 306. If $k_i$ and $k_d$ are both zero, then the controller reduces to a proportional controller. If only $k_d$ is zero, then the controller reduces to a proportional-integral (PI) controller. The control signal (d) is created in block 354 that provides leading-edge modulation with input-output linearization based on the first voltage (y), the second voltage ($y_0$), the adjusted third voltage ($k\Delta y$), the first current ($x_1$) and the fourth voltage ($u_0$), wherein the control signal (d) has a duty cycle defined by $$d = \frac{(RR_cC+L)y + (L-R_cR_sC)Rx_1 + (R+R_c)LCk(y_0-y)}{R\left(R_cCy + \frac{LR}{R+R_c}x_1 - R_cCu_0\right)}.$$

The buck-boost converter is then controlled using the control signal (d) created by the PWM modulator/controller in block 356. In an optional embodiment, the buck-boost converter is controlled in block 358 using a proportional controller, or any suitable type of controller, such as a proportional (P), integral (I) or derivative (D) (or any combination of these three) controller, by replacing $k(y_0-y)$ in the equation defining the duty cycle d with $$\left(k_p + \frac{k_i}{s} + k_d s\right)(y_0 - y)$$

where $k_p$, $k_i$, and $k_d$ are the gains of the proportional, integral, and derivative terms of the controller. If $k_i$ and $k_d$ are both zero, then the controller reduces to a proportional controller. If only $k_d$ is zero, then the controller reduces to a proportional-integral (PI) controller. Note that the control signal can be created using a first order system, or can be independent of a stabilizing gain, a desired output voltage or a desired output trajectory. Likewise, the present invention may include a computer program embodied within a digital signal processor, or FPGA, wherein the steps are implemented as one or more code segments.

A more detailed description of the models used in the present invention will now be described. State space averaging allows the adding together of the contributions for each linear circuit during its respective time interval. This is done by using the duty ratio as a weighting factor on each interval. As shown below, this weighting process leads to a single set of equations for the states and the output. But first, the system will be described by its state space equations.

Assume that a linear system (A, b) is described by $$\dot{x}(t) = Ax(t) + bu(t) \quad (1)$$

where $A \in \mathfrak{R}^{n \times n}$ is an 'n×n' matrix, and $b \in \mathfrak{R}^n$ is an 'n×1' column vector.

As previously mentioned, the duty ratio d is the ratio indicating the time in which a chosen switch is in the "on" position while the other switch is in the "off" position. Ts is the switching period. The "on" time is then denoted as dTs. The general state equations for any type of converter consisting of two linear switched networks are as follows:
For $0 \leq t \leq dTs$, $$\dot{x}(t) = A_\alpha x(t) + b_\alpha u(t) \quad (2a)$$

$dTs \leq t \leq Ts$, $$\dot{x}(t) = A_\beta x(t) + b_\beta u(t) \quad (2b)$$

The equations in (2a) can be combined with the equations in (2b) using the duty ratio, d, as a weighting factor. Thus, $$\dot{x}(t) = (dA_\alpha + d'A_\beta)x(t) + (db_\alpha + d'b_\beta)u(t) \quad (3)$$

which can be written in the form of equation (1) as $$\dot{x}(t) = Ax(t) + bu(t) \quad (4)$$

with $$A = dA_\alpha + d'A_\beta$$

and $$b = db_\alpha + d'b_\beta$$

where $d' = 1 - d$.

The buck cell is linear after state-space averaging and is therefore the easiest topology to control. On the other hand, the boost and buck-boost cells are nonlinear and have non-minimum phase characteristics. These nonlinear cells will be described.

Beginning with a vector field f(x) and a scalar function h(x), the Lie derivative of h with respect to f is denoted by $L_f h$. The derivative is a scalar function and can be understood as the directional derivative of h in the direction of the vector field f.

Definition: For a smooth scalar function b: $\mathfrak{R}^n \to \mathfrak{R}$ and a smooth vector field f: $\mathfrak{R}^n \to \mathfrak{R}^n$, the Lie derivative of h with respect to f is $$L_f b = \nabla b f. \quad (5)$$

or $$L_f b = <\nabla b, f> \quad (6)$$

where $\nabla$ represents the gradient and bold type represents a vector field, $\nabla bf$ is matrix multiplication, and $<\nabla b, f>$ is standard dot product on $\mathfrak{R}^n$.

Lie derivatives of any order can be defined as $$L_f^0 b = b \quad (7)$$

$$L_f^i b = \nabla(L_f^{i-1} b) f = L_f L_f^{i-1} b. \quad (8)$$

Also if g is another smooth vector field g: $\mathfrak{R}^n \to \mathfrak{R}^n$, then $$L_g L_f b = \nabla(L_f b) g. \quad (9)$$

Now, add an output y to the nonlinear system $\dot{x} = f(x) + g(x)u$, where f(x) and g(x) are $C^\infty$ vector fields on $R^n$. Unlike input-state linearization where a transformation is first found to generate a new state vector and a new control input, here the output y is repeatedly differentiated until the input u appears, thereby showing a relationship between y and u.

For the nonlinear system $$\dot{x}=f(x)+g(x)u$$

$$y=b(x) \qquad (10)$$

and a point $x_0$, we differentiate y once to get $$\dot{y}=\nabla b\dot{x}=\nabla bf(x)+\nabla bg(x)u=L_f b(x)+L_g b(x)u.$$

This is differentiated repeatedly until the coefficient of u is non-zero. This procedure continues until for some integer $r \leq n$ $$L_g L_f^i b(x)=0 \text{ for all } x \text{ near } x_0 \text{ and } 0 \leq i \leq r-2$$

and $$L_g L_f^{r-1} b(x_0) \neq 0$$

Then $$u = -\frac{(L_f^r b(x) + v)}{L_g L_f^{r-1} b(x)} \qquad (11)$$

and, for v=0, results in a multiple integrator system with transfer function $$H(s) = \frac{1}{s^r} \qquad (12)$$

State feedback can be added for pole placement with $$v = c_0 b(x) + c_1 L_f b(x) + c_2 L_f^2 b(x) + \ldots + c_{r-1} L_f^{r-1} b(x),$$

where $c_0, c_1, \ldots, c_{r-1}$, are constants to be chosen, and the integer r is the relative degree of the system (2-10). It is the number of differentiations required before u appears.

The first r new coordinates are found as above by differentiating the output h(x)

$$\dot{z}_1 = L_f b(x(t)) = z_2 \qquad (13)$$
$$\dot{z}_2 = L_f^2 b(x(t)) = z_3$$
$$\ldots$$
$$\dot{z}_{r-1} = L_f^{r-1} b(x(t)) = z_r$$
$$\dot{z}_r = L_f^r b(x(t)) + L_g L_f^{r-1} b(x(t))u(t)$$

Since $x(t)=\Phi^{-1}(z(t))$, let $$a(z)=L_g L_f^{r-1} b(\Phi^{-1}(z))$$

$$b(z)=L_f^r b(\Phi^{-1}(z))$$

which is recognized from (11) that a(z) is the denominator term and b(z) is the numerator. Now $$\dot{z}_r = b(z(t)) + a(z(t))u(t)$$

where a(z(t)) is nonzero for all z in a neighborhood of $z^0$.

To find the remaining n−r coordinates, let $$\xi = \begin{bmatrix} z_1 \\ \vdots \\ z_r \end{bmatrix}$$

and $$\eta = \begin{bmatrix} z_{r+1} \\ \vdots \\ z_n \end{bmatrix}.$$

Here $z_{r+1}, \ldots, z_n$ are added to $z_1, \ldots, z_r$ to provide a legitimate coordinate system. With this notation we can write the new coordinates in normal form as $$\dot{z}_1 = z_2 \qquad (14)$$
$$\dot{z}_2 = z_3$$
$$\ldots$$
$$\dot{z}_{r-1} = z_r$$
$$\dot{z}_r = b(\xi, \eta) + a(\xi, \eta)u$$
$$\dot{\eta} = q(\xi, \eta) + p(\xi, \eta)u$$
$$y = z_1$$

The equation for $\dot{\eta}$ represents the n−r equations for which no special form exists. The general equation, however, if the following condition holds $$L_g \Phi_i(x)=0$$

is reduced to $$\dot{\eta} q(\xi, \eta)$$

and the input u does not appear.

In general, the new nonlinear system is described by $$\dot{\xi}=A\xi+Bv$$

$$\dot{\eta}=q(\xi,\eta)+p(\xi,\eta)u$$

$$y=C\xi \qquad (15a,b,c)$$

with the matrices A, B, and C in normal form, and $$v=b(\xi,\eta)+a(\xi,\eta)u$$

If r=n, input-output linearization leads to input-state linearization. If r<n, then there are n−r equations describing the internal dynamics of the system. The zero dynamics, obtained by setting $\xi=0$ in equation (15b) and solving for $\eta$, are very important in determining the possible stabilization of the system (10). If these zero dynamics are non-minimum phase then the input-output linearization in (11) cannot be used. If, however, the zero dynamics are minimum phase it means that pole placement can be done on the linear part of (15a) using (11) and the system will be stable.

In the sequel, the bold letter used to indicate vector fields will only be used when the context is ambiguous as to what is meant. Otherwise, non-bold letters will be used. For a boost converter the driving voltage u(t), the current $x_1$ through the inductor, and the voltage $x_2$ across the capacitor are restricted to be positive, nonnegative, and positive, respectively. Only the continuous conduction mode (CCM) is considered. The duty ratio d is taken to be the control input and is constrained by $0 \leq d \leq 1$. The Ćuk-Middlebrook averaged nonlinear state equations are used to find a feedback transformation that maps these state equations to a controllable linear system. This transformation is one-to-one with the restrictions on u(t), $x_1$ and $x_2$ just mentioned and with additional restrictions involving u̇. These additional restrictions are not needed if u(t) is a constant, as in DC-DC conversion. It is interesting to note that restrictions on u are unnecessary for the boost converter even if u(t) changes with time. The nonlinear system is said to be feedback linearizable or feedback linearized. Through the feedback transformation, the same second order linear system for every operating point can be seen.

The new switching model of the present invention will now be described in more detail. The physical component parasitics $R_s$, the DC series resistance of the filter inductor L, and $R_c$, the equivalent series resistance of the filter capacitor C, now need to be included since $R_c$ especially plays a central role in the analysis to follow.

The system in accordance with the present invention is of the form $$\dot{x}=f(x)+g(x)d$$

$$y=b(x) \tag{16}$$

With this in mind, the state equations are derived to include parasitics $R_s$ and $R_c$.

There are four basic cells for fixed frequency PWM converters. They are the buck, boost, buck-boost, and boost-buck (Ćuk) topologies. Many derivations extend the basic cells in applications where isolation can be added between input and output via transformers, however, the operation can be understood through the basic cell. Each cell contains two switches. Proper operation of the switches results in a two-switch-state topology. In this regime, there is a controlling switch and a passive switch that are either on or off resulting in two "on" states. In contrast, a three state converter would consist of three switches, two controlling switches and one passive switch, resulting in three "on" states.

Figure 4A:
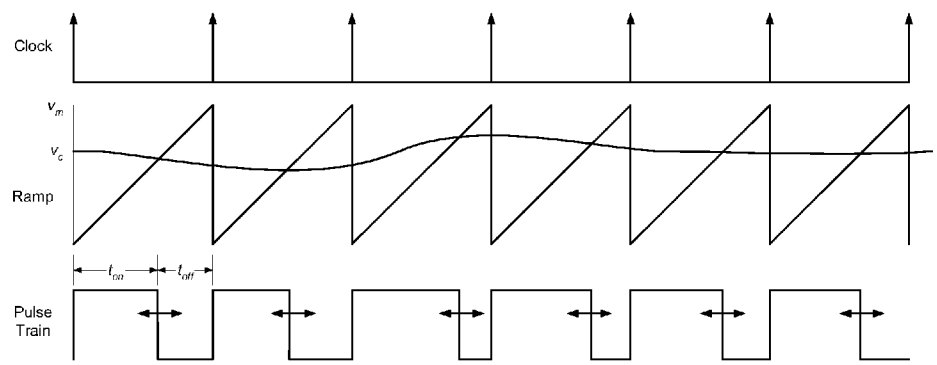
FIGS. 4A and 4B are graphs of trailing-edge modulation of a PWM signal and leading-edge modulation of a PWM

The control philosophy used to control the switching sequence is pulse-width-modulation (PWM). A control voltage $v_c$ is compared with a ramp signal ("sawtooth"), $v_m$, and the output pulse width is the result of $v_c > v_m$. This is shown in FIG. 4A. A new cycle is initiated on the negative slope of the ramp. The pulse ends when $v_c < v_m$ which causes modulation to occur on the trailing edge. This gives it the name "trailing-edge modulation."

Figure 4B:
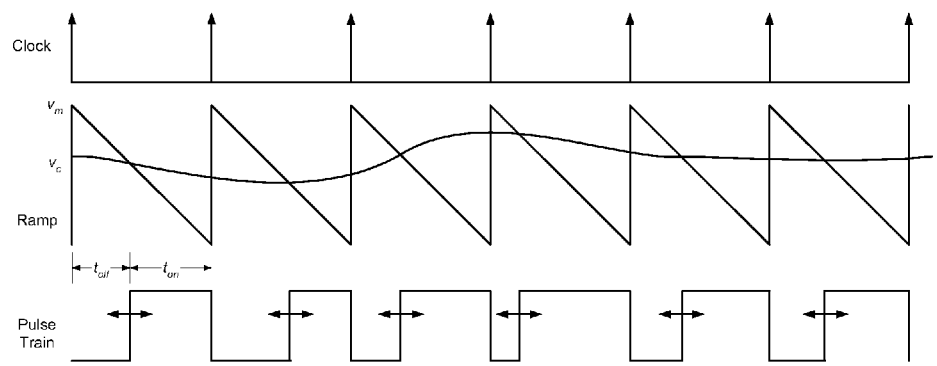

The difference between leading-edge modulation (LEM) and the conventionally used trailing-edge modulation (TEM) is that in TEM (FIG. 4A) the pulse-width is determined by the instantaneous control voltage $v_c$ prior to switch turn-off, whereas in LEM (FIG. 4B) the pulse-width is determined by $v_c$ prior to switch turn-on. The reason that sampling is "just prior" to switch commutation is that the intersection of $v_c$ and $v_m$ determines the new state of the switch. Notice that in FIG. 4B the sawtooth ramp $v_m$ has a negative slope.

Figure 5:
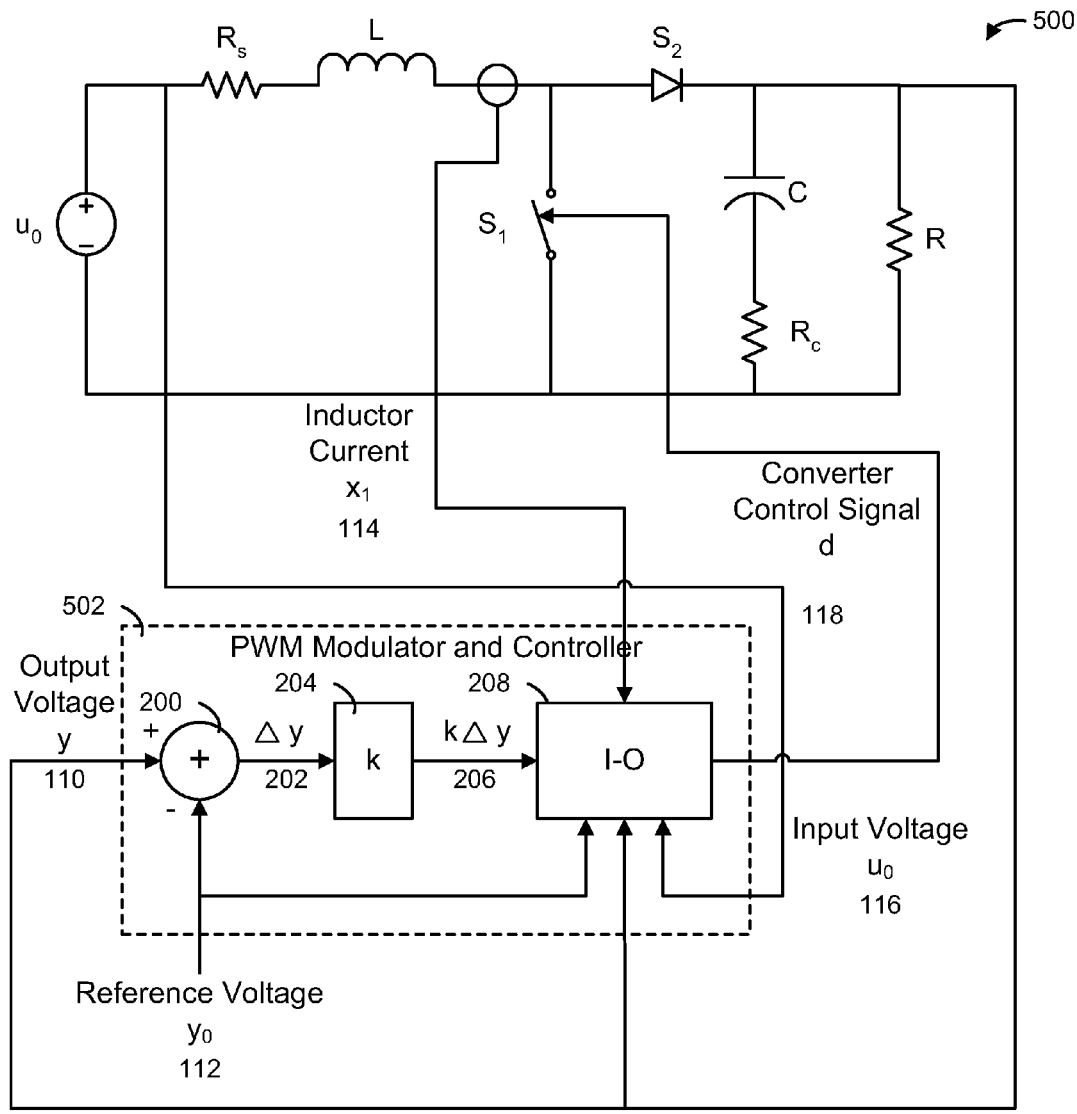
FIG. 5 is circuit diagram of a boost converter and a modulator/controller in accordance with the present invention.
Figure 6A:
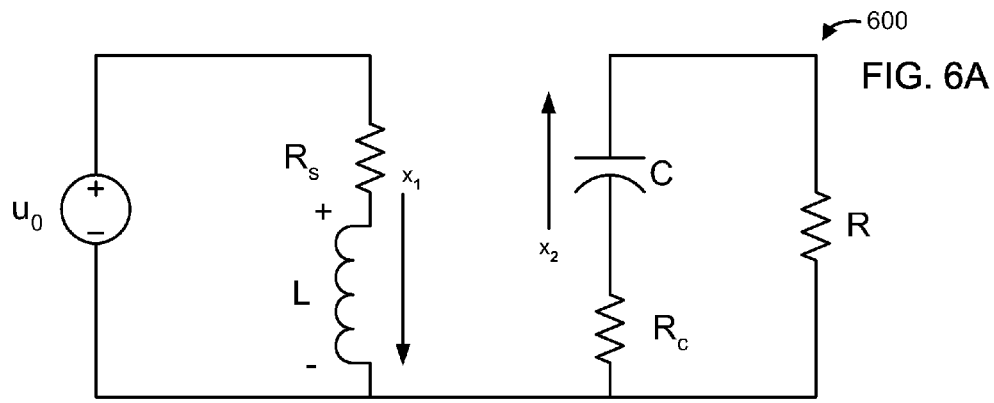
FIGS. 6A and 6B are linear circuit diagrams of a boost converter during time DTs and D'Ts, respectively in accordance with the present invention.
Figure 6B:
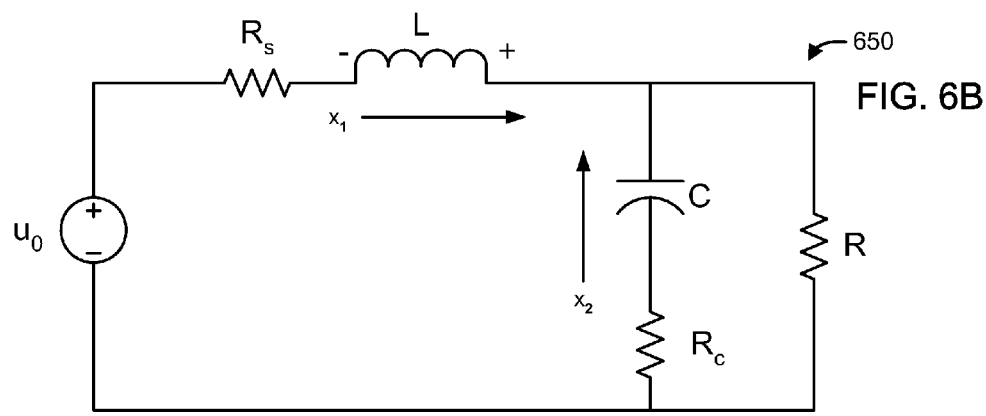
Figure 7:
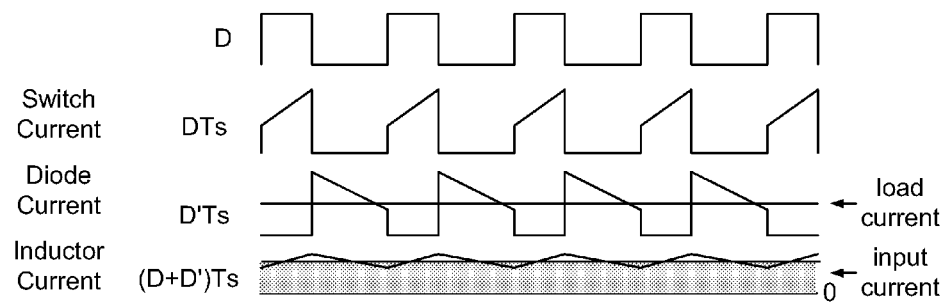
FIG. 7 is a graph of typical waveforms for the boost converter for the two switched intervals DTs and D'Ts in accordance with the present invention.

Now referring to FIG. 5, a circuit diagram 500 of a boost converter and a modulator/controller 502 in accordance with the present invention is shown. The specifics of the boost converter are well known. In this case, S2 is implemented with a diode and S1 is implemented with an N-channel MOSFET. FIGS. 6A and 6B are linear circuit diagrams 600 and 650 of the boost converter in FIG. 5 during time DTs and D'Ts, respectively. The converter 500 operates as follows: $u_0$ provides power to the circuit during S1 conduction time (FIG. 6A) storing energy in inductor L. During this time S2 is biased off. When S1 turns off, the energy in L causes the voltage across L to reverse polarity. Since one end is connected to the input source, $u_0$, it remains clamped while the other end forward biases diode S2 and clamped to the output. Current continues to flow through L during this time (FIG. 6B). When S1 turns back on, the cycle repeats. FIG. 7 illustrates the typical waveforms for the boost converter for the two switched intervals DTs and D'Ts.

The DC transfer function needs to be determined in order to know how the output, y, across the load R is related to the input $u_0$ at zero frequency. In steady state, the volt-second integral across L is equal to zero. Thus, $$\int_0^{T_s} v_L dt = 0 \tag{17}$$

where Ts is the switching period.

Therefore, the volt-seconds during the on-time must equal the volt-seconds during the off-time. Using this volt-second balance constraint one can derive an equation for volt-seconds during the on-time of S1 (DTs) and another equation for volt-seconds during the off-time of S1 (D'Ts).

The parasitics are eliminated by setting $R_s = 0$ and $R_c = 0$. During time DTs:

$$DT_s v_L = DT_s u_0 \tag{18}$$

During time D'Ts:

$$D'T_s v_L = D'T_s x_2 - D'T_s u_0 \tag{19}$$

Since by equation (17)

$$DT_s v_L = D'T_s v_L$$

the RHS of equation (18) is set equal to the RHS of equation (19) resulting in $$\frac{x_2}{u_0} = \frac{1}{D'} \tag{20}$$

Equation (20) is the ideal duty ratio equation for the boost cell. If $R_s$ and $R_c$ are both non-zero then $$\frac{y}{u_0 - x_1 R_s} = \frac{1}{D'} \tag{21}$$

The output y is $$y = D'\frac{RR_c}{R+R_c}x_1 + \frac{R}{R+R_c}x_2 \tag{22}$$

Now the state space averaged equations are derived during dTs:

$$\dot{x}_1 = \frac{1}{L}u - \frac{R_s}{L}x_1$$

$$\dot{x}_2 = -\frac{1}{C(R+R_c)}x_2$$

And during (1−d)Ts:

$$\dot{x}_1 = \frac{1}{L}\left[-\left(R_s + \frac{RR_c}{R+R_c}\right)x_1 - \frac{R}{R+R_c}x_2 + u_0\right]$$

$$\dot{x}_2 = \frac{R}{C(R+R_c)}x_1 - \frac{1}{C(R+R_c)}x_2$$

Combining, the averaged equations are:

$$\dot{x}_1 = \frac{1}{L}u_0 - \frac{R_s}{L}x_1 - \frac{RR_c}{L(R+R_c)}x_1(1-d) - \frac{R}{L(R+R_c)}x_2(1-d) \quad (23a,b,c)$$

$$\dot{x}_2 = \frac{R}{C(R+R_c)}x_1(1-d) - \frac{1}{C(R+R_c)}x_2$$

$$y = \frac{R}{(R+R_c)}x_2 + \frac{RR_c}{(R+R_c)}x_1(1-d)$$

where $R_s$ is the dc resistance of L and $R_c$ is the equivalent series resistance of C.

In standard form:

$$\dot{x}_1 = \frac{u_0}{L} - \frac{R}{L(R+R_c)}x_2 - \quad (24a,b,c)$$

$$\left(\frac{R_s}{L} + \frac{RR_c}{L(R+R_c)}\right)x_1 + \left(\frac{RR_c}{L(R+R_c)}x_1 + \frac{R}{L(R+R_c)}x_2\right)d$$

$$\dot{x}_2 = -\frac{1}{C(R+R_c)}x_2 + \frac{R}{C(R+R_c)}x_1 - \frac{R}{C(R+R_c)}x_1 d$$

$$y = \frac{RR_c}{(R+R_c)}x_1 + \frac{R}{(R+R_c)}x_2$$

Here it is assumed that leading-edge modulation is used so that sampling of the output y only takes place during the interval $(1-d)T_s$. Therefore, the weighting factor $(1-d)$ in equation (23c) for y has been removed because when the sample is taken the data represents both terms as shown in equation (24c). In the present analysis the effects of sampling (complex positive zero pair at one-half the sampling frequency) have been ignored.

The input-output linearization for the boost converter will now be discussed. The output, y, only needs to be differentiated once before the control d appears.

$$y = \frac{R}{R+R_c}(x_2 + R_c x_1) \quad (25)$$

$$\dot{y} = \frac{R}{R+R_c}(\dot{x}_2 + R_c \dot{x}_1) \quad (26a)$$

$$\dot{y} = \left(\frac{R}{R+R_c}\right)\left(\frac{1}{C(R+R_c)}(-x_2 + Rx_1 - Rx_1 d) + \frac{R_c}{L}\left(u_0 - \frac{R}{R+R_c}x_2 - \right.\right. \quad (26b)$$

$$\left.\left.\left(R_s + \frac{RR_c}{R+R_c}\right)x_1 + \left(\frac{RR_c}{R+R_c}x_1 + \frac{R}{R+R_c}x_2\right)d\right)\right)$$

Substituting for $x_2$ from (25), setting $\dot{y}$ equal to $k(y_0-y)$, k>0, and solving for d we get, $$d = \frac{(RR_c C + L)y - (L - R_s R_c C)Rx_1 - \quad (27)}{R\left(R_c Cy - \frac{LR}{R+R_c}x_1\right)}$$

where $$R\left(R_c Cy - \frac{LR}{R+R_c}x_1\right) > 0.$$

Here $y_0$ is the desired output corresponding to $x_{10}$ and $x_{20}$ through equation (25). The notation has changed and $k=c_0$ in equation (11), and the control input is now d instead of u. Here $(x_{10}, x_{20})$ is an equilibrium point of the boost converter. The proportional term $k(y_0-y)$ can be replaced by any suitable controller, such as a proportional (P), integral (I) or derivative (D) (or any combination of these three) by replacing $k(y_0-y)$ in the equation defining the duty cycle d with $$\left(k_p + \frac{k_i}{s} + k_d s\right)(y_0 - y)$$

where $k_p$, $k_i$, and $k_d$ are the gains of the proportional, integral, and derivative terms of the controller. If $k_i$ and $k_d$ are both zero, then the controller reduces to a proportional controller. If only $k_d$ is zero, then the controller reduces to a proportional-integral (PI) controller.

The control is part of the transformation as shown in equation (27) where it is seen that $k(y-y_0)$ is in the numerator, and k is the proportional gain. The proportional term $k(y_0-y)$ can be replaced by any suitable controller, such as a proportional (P), integral (I) or derivative (D) (or any combination of these three) by replacing $k(y_0-y)$ in the equation defining the duty cycle d with $$\left(k_p + \frac{k_i}{s} + k_d s\right)(y_0 - y)$$

where $k_p$, $k_i$, and $k_d$ are the gains of the proportional, integral, and derivative terms of the controller. If $k_i$ and $k_d$ are both zero, then the controller reduces to a proportional controller. If only $k_d$ is zero, then the controller reduces to a proportional-integral (PI) controller. The control implementation is shown in FIG. 2.

Local linearization of the boost converter will now be discussed to obtain a transfer function. A Taylor Series linearization is used on the nonlinear system (24abc) to linearize about an operating point, $x_{10}$, $x_{20}$, D and obtain the transfer function. We let $$\hat{x}_1 = x_1 - x_{10}, \hat{x}_2 = x_2 - x_{20}, \hat{y} = y - y_0, \hat{d} = d - D.$$

which gives $$\dot{\hat{x}}_1 = \frac{1}{L}\left[-\frac{(1-D)R}{R+R_c}\hat{x}_2 - \frac{(1-D)RR_c}{R+R_c}\hat{x}_1 - R_s \hat{x}_1 + \left(\frac{RR_c}{R+R_c}x_{10} + \frac{R}{R+R_c}x_{20}\right)\hat{d}\right]$$

$$\dot{\hat{x}}_2 = \frac{1}{C(R+R_c)}\left[-\hat{x}_2 + (1-D)R\hat{x}_1 - Rx_{10}\hat{d}\right]$$

In matrix form $$\begin{bmatrix}\dot{\hat{x}}_1 \\ \dot{\hat{x}}_2\end{bmatrix} = \begin{bmatrix} -\left(\frac{RR_c(1-D)}{L(R+R_c)} + \frac{R_s}{L}\right) & -\frac{(1-D)R}{L(R+R_c)} \\ \frac{R(1-D)}{C(R+R_c)} & -\frac{1}{C(R+R_c)} \end{bmatrix}\begin{bmatrix}\hat{x}_1 \\ \hat{x}_2\end{bmatrix} + \begin{bmatrix}\frac{RR_c x_{10} + Rx_{20}}{L(R+R_c)} \\ -\frac{Rx_{10}}{C(R+R_c)}\end{bmatrix}\hat{d}.$$

Making the following substitutions, which can be derived by letting $\dot{x}_1=0$, $\dot{x}_2=0$, $x_1=x_{10}$, $x_2=x_{20}$, $R_c=0$, and $R_s=0$ in (24ab):

$$x_{10} = \frac{u_0}{(1-D)^2 R}$$

and $$x_{20} = \frac{u_0}{(1-D)}$$

results in $$\begin{bmatrix} \dot{\hat{x}}_1 \\ \dot{\hat{x}}_2 \end{bmatrix} = \begin{bmatrix} -\left(\frac{RR_c(1-D)}{L(R+R_c)}\right) & -\frac{(1-D)R}{L(R+R_c)} \\ \frac{R(1-D)}{C(R+R_c)} & -\frac{1}{C(R+R_c)} \end{bmatrix} \begin{bmatrix} \hat{x}_1 \\ \hat{x}_2 \end{bmatrix} + \qquad (28)$$

$$\begin{bmatrix} \frac{u_0}{L(R+R_c)(1-D)}\left(\frac{R_c}{(1-D)}+R\right) \\ -\frac{u_0}{C(R+R_c)(1-D)^2} \end{bmatrix} \hat{d}.$$

$$\hat{y} = \begin{bmatrix} \frac{RR_c}{R+R_c} & \frac{R}{R+R_c} \end{bmatrix} \hat{x} \qquad (29)$$

Now a linear system is provided $$\dot{\hat{x}} = A\hat{x} + B\hat{d}$$

$$\hat{y} = C\hat{x} \qquad (30)$$

where A is an n×n matrix, B is an n-column vector, and C is an n-row vector.

To find the control-to-output transfer function, solve the matrix equation $$G(s) = C[sI-A]^{-1}B.$$

and obtain $$G(s) = \frac{1}{\Delta(s)} \begin{bmatrix} \frac{RR_c}{R+R_c} & \frac{R}{R+R_c} \end{bmatrix} \begin{bmatrix} s + \frac{1}{C(R+R_c)} & -\frac{(1-D)R}{L(R+R_c)} \\ \frac{R(1-D)}{C(R+R_c)} & s + \left(\frac{RR_c(1-D)}{L(R+R_c)}\right) \end{bmatrix}$$

$$\begin{bmatrix} \frac{u_0}{L(R+R_c)(1-D)}\left(\frac{R_c}{(1-D)}+R\right) \\ -\frac{u_0}{C(R+R_c)(1-D)^2} \end{bmatrix}$$

If we let powers greater than one of $R_c$ equal zero, further evaluation results in $$G(s) = \qquad (31)$$

$$\frac{1}{\Delta(s)} \left[ \frac{u_0}{LCR(1-D)^2} [(RR_cC(1-D) - L)s + 2R_c(1-D) + R(1-D)^2] \right]$$

where $\Delta(s)$ is the determinant of is [sI–A] which is $$\Delta(s) = s^2 + \frac{L + RR_cC(1-D)}{LC(R+R_c)} s + \frac{R(1-D)(R_c + R(1-D))}{LC(R+R_c)^2} \qquad (32)$$

Taking the term in (31) associated with s, the zero of the linear system needs to be in the left-half plane, so this term needs to remain positive. Solving for $R_cC$ we have $$R_cC > \frac{L}{R(1-D)} \qquad (33)$$

Note that the inequality (33) can also be derived from the denominator of (27) by setting $(R+R_c)=R$, i.e., $R \gg R_c$ and with the following substitution for $x_1$, $$x_1 = \frac{y}{R(1-D)}.$$

At this point, the transfer function has been shown to be the linear approximation of the nonlinear system having a left-half plane zero under constraint (33). The zeros of the transfer function of the linear approximation of the nonlinear system at x=0 coincide with the eigenvalues of the linear approximation of the zero dynamics of the nonlinear system at $\eta=0$. Therefore, the original nonlinear system (24) has asymptotically stable zero dynamics. Furthermore, the following proposition is associated with the system (14).

Proposition. Suppose the equilibrium n=0 of the zero dynamics of the system is locally asymptotically stable and all the roots of the polynomial p(s) have negative real part. Then the feedback law $$u = \frac{1}{a(\xi, \eta)}(-b(\xi, \eta) - c_o z_1 - c_1 z_2 - \ldots - c_{r-1} z_r) \qquad (34)$$

locally asymptotically stabilizes the equilibrium $(\xi, \eta) = (0, 0)$.

The polynomial $$p(s) = s^r + c_{r-1}s^{r-1} + \ldots + c_1 s + c_0 \qquad (35)$$

is the characteristic polynomial of the matrix A associated with the closed loop system (see equations (14) and (34) and recall that $z=\xi$)

$$\dot{\xi} = A\xi + Bv$$

$$\dot{\eta} = q(\xi, \eta) \qquad (36)$$

where $\dot{\xi} = A\xi + Bv$ are the linear part of the system and $\dot{\eta} = q(0, \eta)$ are the zero dynamics. The matrix A is given by $$A = \begin{bmatrix} 0 & 1 & 0 & \ldots & 0 \\ 0 & 0 & 1 & \ldots & 0 \\ \vdots & \vdots & \vdots & \vdots & \vdots \\ 0 & 0 & 0 & \ldots & 1 \\ -c_o & -c_1 & -c_2 & \ldots & -c_{r-1} \end{bmatrix}.$$

and the vector B is given by $$B = [0, \ldots, 0, 1]^T.$$

The feedback law in equation (34) can be expressed in the original coordinates as $$u = \frac{1}{L_g L_f^{r-1} b(x)}(-L_f^r b(x) - c_o b(x) - c_1 L_f b(x) - \ldots - c_{r-1} L_f^{r-1} b(x)) \qquad (37)$$

As shown in equation (26), the input d appears after only one differentiation so the relative degree is one. This means that the present invention is a single order linear system containing only one root, thus the present invention can be expressed in the new coordinates as $$\dot{\xi} = -k\xi + v$$

$$\dot{\eta} = q(\xi, \eta)$$

$$y = \xi$$

The polynomial p(s) is simply p(s)=s+k, with k>0, so that the denominator is now a real pole in the open left half plane.

In accordance with the Proposition, the root of the polynomial p(s) has a negative real part, and as shown above, the present invention has asymptotically stable zero dynamics. Therefore, it can be concluded that, given a control law of the form (37), the original nonlinear system (24) is locally asymptotically stable.

The following theorem has been proven.

Theorem 1: For a boost converter with asymptotically stable zero dynamics (using leading-edge modulation), with constraint $$R_c C > \frac{L}{R(1-D)} \quad (38)$$

and control law $$d = \frac{1}{L_g L_f^{r-1} y}(-L_f^r y - k(y - y_o)); \quad (39)$$

the nonlinear system $$\dot{\xi} = -k\xi + v$$

$$\dot{\eta} q(\xi, \eta),$$

$$y = \xi \quad (40)$$

with v=0, is asymptotically stable at each equilibrium point (the characteristic polynomial p(s) has a root with negative real part) which means that the original nonlinear system $$\dot{x} = f(x) + g(x)d$$

$$y = b(x) \quad (41)$$

is locally asymptotically stable at each equilibrium point $(x_{10}, x_{20})$ in the set $$S = \{(x_1, x_2), x \in \mathfrak{R}^n : x_1 \geq 0, x_2 > 0\}$$

with 0≤d≤<1.

Recall that $(x_{10}, x_{20})$ corresponds to $y_0$ through equation (25). Theorem 1 indicates local asymptotic stability. In practice, the reference input $y_0$ is ramped up in a so-called "soft-start" mode of operation. This theorem also guarantees local asymptotic stability at each operating point passed through by the system on its way up to the desired operating point.

Figure 8:
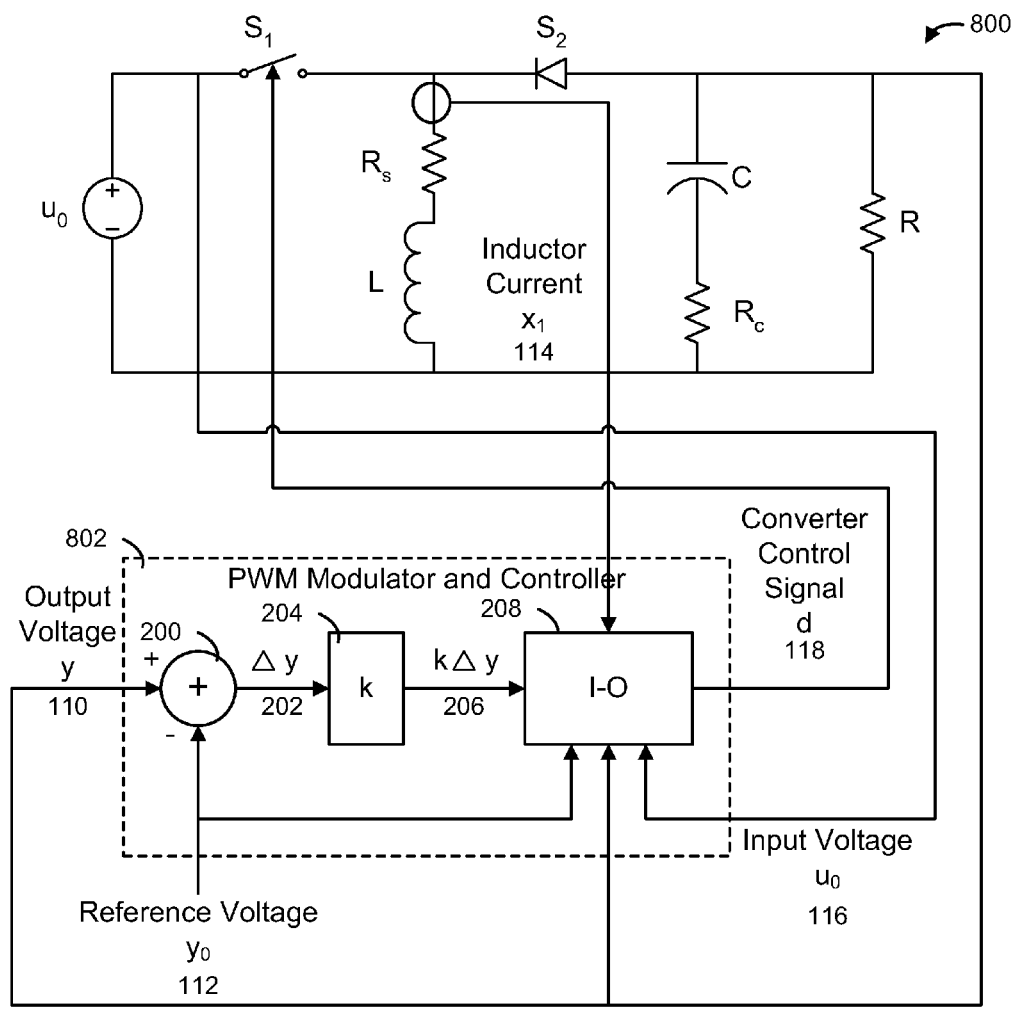
FIG. 8 is circuit diagram of a buck-boost converter and a modulator/controller in accordance with the present invention.
Figure 9A:
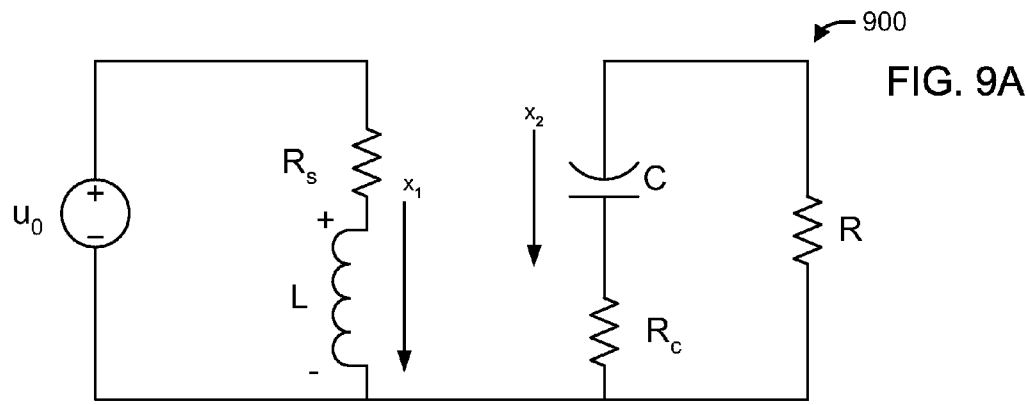
FIGS. 9A and 9B are linear circuit diagrams of a buck-boost converter during time DTs and D'Ts, respectively in accordance with the present invention.
Figure 9B:
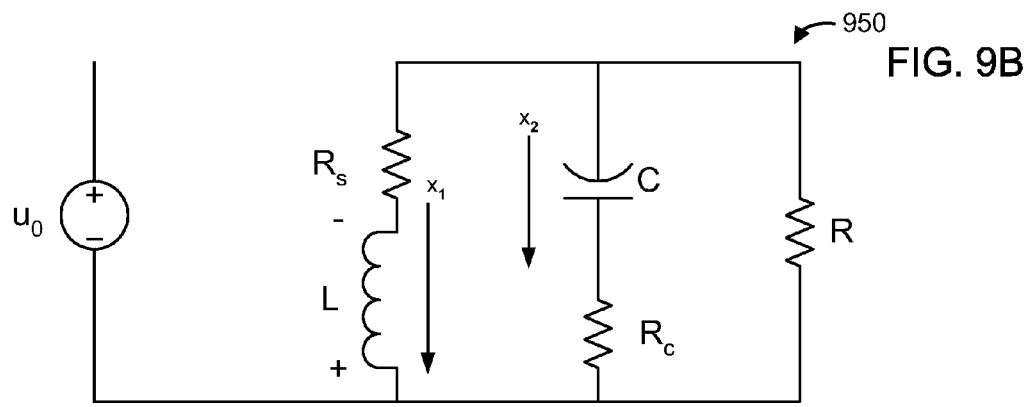
Figure 10:
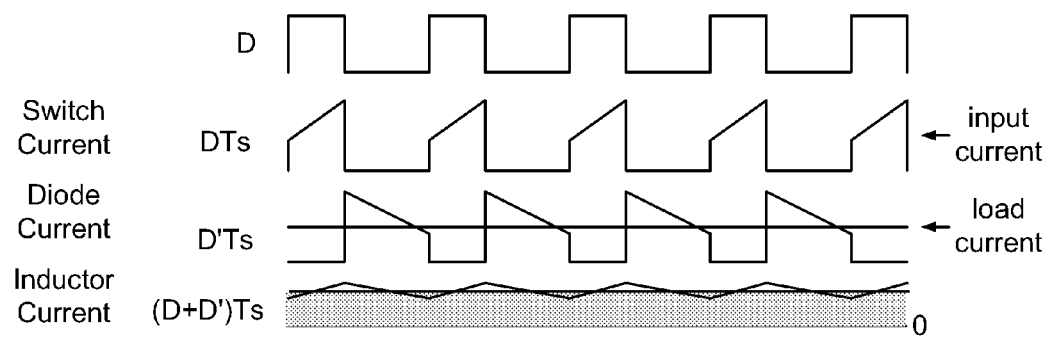
FIG. 10 is a graph of typical waveforms for the buck-boost converter for the two switched intervals DTs and D'Ts in accordance with the present invention.

Now referring to FIG. 8, a circuit diagram 800 of a buck-boost converter and a modulator/controller 802 in accordance with the present invention are shown. The details of buck-boost converters are well known. In this case, S2 is implemented with a diode and S1 is implemented with an N-channel MOSFET. FIGS. 9A and 9B are linear circuit diagrams 900 and 950 of a buck-boost converter during time DTs and D'Ts. The operation of the converter is as follows: $u_0$ provides power to the circuit during S1 conduction time (FIG. 9A) storing energy in inductor L. During this time S2 is biased off. When S1 turns off, the energy in L causes the voltage across L to reverse polarity. Since one end is connected to circuit return, it remains clamped while the other end forward biases diode S2 and clamps to the output. Current continues to flow through L during this time (FIG. 9B). When S1 turns back on, the cycle repeats. It should be noted that the output voltage is inverted, i.e., negative. FIG. 10 is a graph of typical waveforms for the buck-boost converter for the two switched intervals DTs and D'Ts. A typical embodiment of the buck-boost converter where the output voltage is positive is the "flyback" converter where a transformer with phase reversal is used instead of an inductor.

It is again desirable to find the DC transfer function to know how the output, y, across the load R is related to the input $u_0$ at zero frequency. In steady state, the volt-second integral across L is again equal to zero. Thus, $$\int_0^{T_s} v_L \, dt = 0 \quad (42)$$

where Ts is the switching period.

Therefore, the volt-seconds during the on-time must equal the volt-seconds during the off-time. Using this volt-second balance constraint one can derive an equation for volt-seconds during the on-time of S1 (DTs) and another equation for volt-seconds during the off-time of S1 (D'Ts).

The parasitics are eliminated by setting $R_s$=0 and $R_c$=0. During time DTs:

$$DT_s v_L = DT_s u_0 \quad (43)$$

During time D'Ts:

$$D'T_s v_L = D'T_s x_2 \quad (44)$$

Since by equation (42)

$$DT_s v_L = D'T_s v_L$$

The RHS of equation (43) is set equal to the RHS of equation (44) to provide $$\frac{x_2}{u_0} = \frac{D}{D'} \quad (45)$$

$$y = -x_2$$

Equation (45) is the ideal duty ratio equation for the buck-boost cell. If $R_s$ and $R_c$ are both non-zero then $$\frac{y}{u_0} - \frac{x_1 R_s}{D' u_0} = -\frac{D}{D'} \quad (46)$$

The output y is $$y = -D' \frac{R R_c}{R + R_c} x_1 - \frac{R}{R + R_c} x_2 \quad (47)$$

Once again it is seen in equation (46) that parasitic $R_s$ should be minimized. For example if $R_s$=0 and $R_c$=0, then equation (46) reduces to the ideal equation (45).

Now the state space averaged equations are derived during dTs:

$$\dot{x}_1 = \frac{1}{L} u - \frac{R_s}{L} x_1$$

$$\dot{x}_2 = -\frac{1}{C(R + R_c)} x_2$$

And during (1−d)Ts:

$$\dot{x}_1 = -\frac{R_s}{L} x_1 - \frac{R R_c}{L(R + R_c)} x_1 - \frac{R}{L(R + R_c)} x_2$$

-continued $$\dot{x}_2 = \frac{R}{C(R+R_c)}x_1 - \frac{1}{C(R+R_c)}x_2$$

Combining, the averaged equations are:

$$\dot{x}_1 = \frac{1}{L}u_0 d - \frac{R_s}{L}x_1 - \frac{RR_c}{L(R+R_c)}x_1(1-d) - \frac{Rx_2}{L(R+R_c)}(1-d) \quad (48a)$$

$$\dot{x}_2 = \frac{R}{C(R+R_c)}x_1(1-d) - \frac{1}{C(R+R_c)}x_2 \quad (49b,c)$$

$$y = -\frac{RR_c}{(R+R_c)}x_1(1-d) - \frac{R}{(R+R_c)}x_2$$

In standard form:

$$\dot{x}_1 = -\frac{R}{L(R+R_c)}x_2 - \left(\frac{R_s}{L} + \frac{RR_c}{L(R+R_c)}\right)x_1 + \quad (50a, b, c)$$
$$\left(\frac{RR_c}{L(R+R_c)}x_1 + \frac{R}{L(R+R_c)}x_2 + \frac{u_0}{L}\right)d$$

$$\dot{x}_2 = -\frac{1}{C(R+R_c)}x_2 + \frac{R}{C(R+R_c)}x_1 - \frac{R}{C(R+R_c)}x_1 d$$

$$y = -\frac{RR_c}{(R+R_c)}x_1 - \frac{R}{(R+R_c)}x_2$$

Here it is assumed that leading-edge modulation is used so that sampling of the output y only takes place during the interval $(1-d)T_s$. Therefore, the weighting factor $(1-d)$ in equation (49c) for y has been removed in equation (50c) because when the sample is taken the data represents both terms. In the present analysis the effects of sampling (complex positive zero pair at one-half the sampling frequency) have been ignored.

The output, y, only needs to be differentiated once before the control d appears. Thus, $$y = \frac{R}{R+Rc}(-R_c x_1 - x_2) \quad (51)$$

$$\dot{y} = \frac{R}{R+Rc}(-R_c \dot{x}_1 - \dot{x}_2) \quad (52a)$$

$$\dot{y} = \frac{R}{R+Rc}\left(-R_c\left(-\frac{R}{L(R+R_c)}x_2 - \left(\frac{R_s}{L} + \frac{RR_c}{L(R+R_c)}\right)x_1 + \quad (52b)\right.\right.$$
$$\left(\frac{RR_c}{L(R+R_c)}x_1 + \frac{R}{L(R+R_c)}x_2 + \frac{u_0}{L}\right)d\right) -$$
$$\left.\left(-\frac{1}{C(R+R_c)}x_2 + \frac{R}{C(R+R_c)}x_1 - \frac{R}{C(R+R_c)}x_1 d\right)\right)$$

Substituting for $x_2$ from (51), setting $\dot{y}$ equal to $k(y_0-y)$, $k>0$, and solving for d provides, $$d = \frac{(RR_c C + L)y + (L - R_c R_s C)Rx_1 + (R+R_c)LCk(y_0 - y)}{R\left(R_c Cy + \frac{LR}{R+R_c}x_1 - R_c Cu_0\right)} \quad (53)$$

where $$R\left(R_c Cy + \frac{LR}{R+R_c}x_1 - R_c Cu_0\right) > 0.$$

Here $y_0$ is the desired output corresponding to $x_{10}$ and $x_{20}$ through equation (51). The notation has changed and $k=c_0$ in equation (11), and the control input is now d instead of u. Here $(x_{10}, x_{20})$ is an equilibrium point of our buck-boost converter. Implementation of the control is the same as shown in FIG. 2. The same definitions are used, so the local linearization will be discussed.

To obtain the transfer function, a Taylor Series linearization is again used on the nonlinear system (50) to linearize about an operating point, $x_{10}, x_{20}, D$ to provide $$\hat{x}_1 = x_1 - x_{10}, \hat{x}_2 = x_2 - x_{20}, \hat{y} = y - y_0, \hat{d} = d - D.$$

This gives $$\dot{\hat{x}}_1 = -\left(\frac{R_s}{L} + \frac{RR_c}{L(R+R_c)}(1-D)\right)\hat{x}_1 -$$
$$\frac{R}{L(R+R_c)}(1-D)\hat{x}_2 + \left(\frac{RR_c}{L(R+R_c)}x_{10} + \frac{R}{L(R+R_c)}x_{20} + \frac{u_0}{L}\right)\hat{d}$$

$$\dot{\hat{x}}_2 = \frac{R}{C(R+R_c)}(1-D)\hat{x}_1 - \frac{1}{C(R+R_c)}\hat{x}_2 - \frac{R}{C(R+R_c)}x_{10}\hat{d}$$

In matrix form $$\begin{bmatrix}\dot{\hat{x}}_1 \\ \dot{\hat{x}}_2\end{bmatrix} = \begin{bmatrix} -\left(\frac{R_s}{L} + \frac{RR_c(1-D)}{L(R+R_c)}\right) & -\frac{R(1-D)}{L(R+R_c)} \\ \frac{R(1-D)}{C(R+R_c)} & -\frac{1}{C(R+R_c)} \end{bmatrix}\begin{bmatrix}\hat{x}_1 \\ \hat{x}_2\end{bmatrix} + \begin{bmatrix} \frac{RR_c x_{10}}{L(R+R_c)} + \frac{Rx_{20}}{L(R+R_c)} + \frac{u_0}{L} \\ -\frac{Rx_{10}}{C(R+R_c)} \end{bmatrix}\hat{d}.$$

Making the following substitutions, which can be derived by letting $\dot{x}_1=0$, $\dot{x}_2=0$, $x_1=x_{10}$, $x_2=x_{20}$, $R_c=0$, and $R_s=0$ in (50ab):

$$x_{10} = \frac{Du_0}{(1-D)^2 R} \quad (54)$$

and $$x_{20} = \frac{Du_0}{(1-D)}$$

to get $$\begin{bmatrix}\dot{\hat{x}}_1 \\ \dot{\hat{x}}_2\end{bmatrix} = \begin{bmatrix} -\left(\frac{R_s}{L} + \frac{RR_c(1-D)}{L(R+R_c)}\right) & -\frac{R(1-D)}{L(R+R_c)} \\ \frac{R(1-D)}{C(R+R_c)} & -\frac{1}{C(R+R_c)} \end{bmatrix}\begin{bmatrix}\hat{x}_1 \\ \hat{x}_2\end{bmatrix} + \begin{bmatrix} \frac{Du_0}{(1-D)L}\left(\frac{R_c}{(R+R_c)(1-D)} + \frac{R}{(R+R_c)}\right) + \frac{u_0}{L} \\ \frac{u_0 D}{C(R+R_c)(1-D)^2} \end{bmatrix}\hat{d}$$

$$\hat{y} = \begin{bmatrix} -\frac{RR_c}{R+R_c} & -\frac{R}{R+R_c} \end{bmatrix}\hat{x} \quad (55)$$

Now the linear system $$\dot{\hat{x}} = A\hat{x} + B\hat{d}$$

$$\hat{y} = C\hat{x} \quad (56)$$

is provided where A is an n×n matrix, B is an n-column vector, and C is an n-row vector.

To find the control-to-output transfer function the matrix equation is solved $$G(s) = C[sI-A]^{-1}B.$$

After some algebra, letting powers greater than one of $R_c$ equal zero provides $$G(s) = \frac{1}{\Delta(s)}\left\{-\frac{u_0}{LCR(1-D)^2}\right. \tag{57}$$

$$\left.([RR_cC(1-D) - LD]s + (1+D^2)R_c + R(1-D)^2)\right\}$$

where $\Delta(s)$ is the determinant of $[sI-A]$ which is $$\Delta(s) = s^2 + \left(\frac{L + RR_cC(1-D)}{LC(R+R_c)}\right)s + \frac{R(1-D)[R_c + R(1-D)]}{LC(R+R_c)^2} \tag{58}$$

Taking the term in (57) associated with s, the zero of the linear approximation of the system should be in the left-half plane, so this term needs to remain positive. Solving for $R_cC$ results in $$R_cC > \frac{LD}{R(1-D)}. \tag{59}$$

Note that the inequality (59) can also be derived from the denominator of (53) by setting $(R+R_c)=R$, i.e., $R \gg R_c$ and with the following substitutions for $x_1$ and $u_0$, $$x_1 = -\frac{y}{R(1-D)}$$

and $$u_0 = -y\frac{(1-D)}{D}.$$

At this point, it has been shown that the transfer function of the linear approximation of the nonlinear system has a left-half plane zero under constraint (59). As before, it is known that the zeros of the transfer function of the linear approximation of the nonlinear system at x=0 coincide with the eigenvalues of the linear approximation of the zero dynamics of the nonlinear system at η=0. Therefore, the original nonlinear system (50) has asymptotically stable zero dynamics.

The Proposition is again used, with p(s) as above in equation (35) and the closed loop system as in equation (36). As shown in equation (52), the input d appears after only one differentiation so the relative degree is again one. This means that the present invention is a single order linear system containing only one root, thus the present invention can be expressed in the new coordinates as $$\dot{\xi} = -k\xi + v$$

$$\dot{\eta} = q(\xi, \eta)$$

$$y = \xi$$

The polynomial p(s) is simply $p(s)=s+k$, with $k>0$, so that the denominator is now a real pole in the open left half plane.

In accordance with the Proposition, the root of the polynomial p(s) has a negative real part, and as shown above, the present invention has asymptotically stable zero dynamics. Therefore, given a control law of the form (37), it can be concluded that the original nonlinear system (50) is locally asymptotically stable.

The following theorem has been proven.

Theorem 2: For a buck-boost converter with asymptotically stable zero dynamics (using leading-edge modulation), with constraint $$R_cC > \frac{LD}{R(1-D)} \tag{60}$$

and control law $$d = \frac{1}{L_g L_f^{r-1} y}(-L_f^r y - k(y - y_0)); \tag{61}$$

the nonlinear system $$\dot{\xi} = -k\xi + v$$

$$\dot{\eta} q(\xi, \eta),$$

$$y = \xi \tag{62}$$

with v=0, is asymptotically stable at each equilibrium point (the characteristic polynomial p(s) has a root with negative real part) which means that the original nonlinear system $$\dot{x} = f(x) + g(x)d$$

$$y = b(x) \tag{63}$$

is locally asymptotically stable at each equilibrium point $(x_{10}, x_{20})$ in the set $$S = \{(x_1, x_2) x \in \mathcal{R}^n : x_1 \geq 0, x_2 > 0\}$$

with $0 \leq d < 1$.

Recall that $(x_{10}, x_{20})$ corresponds to $y_0$ through equation (51).

Theorem 2 indicates local asymptotic stability. In practice, the reference input $y_0$ is ramped up in a so-called "soft-start" mode of operation. This theorem also guarantees local asymptotic stability at each operating point passed through by the system on its way up to the desired operating point.

Although preferred embodiments of the present invention have been described in detail, it will be understood by those skilled in the art that various modifications can be made therein without departing from the spirit and scope of the invention as set forth in the appended claims.

The invention claimed is:

1. A system for converting an input voltage to an output voltage, comprising:
a voltage converter circuit comprising an inductor, powered by the input voltage and producing an inductor current through the inductor;
a controller connected to the voltage converter circuit, the output voltage, and the input voltage;
a reference voltage connected to the controller;
a control signal generated by the controller for the voltage converter circuit, comprising a duty cycle based on the input voltage, the output voltage, the reference voltage, and the inductor current;
whereby the voltage converter circuit generates the output voltage based on the duty ratio;

wherein the duty cycle is given by $$d = \frac{(RR_cC+L)y - (L-R_cR_sC)Rx_1 - RR_cCu_0 + (R+R_c)LCk(y_0-y)}{R\left(R_cCy + \frac{LR}{R+R_c}x_1\right)};$$

wherein C is a capacitance value of a capacitor of the voltage converter circuit, $R_C$ is a series capacitive resistance of the capacitor, R is a load resistance, L is an inductance value of an inductor of the voltage converter circuit, $R_S$ is a series resistance of the inductor, and $u_0$ is the input voltage; and, wherein $y_0$ is the reference voltage, y is the output voltage, k is a proportional gain factor, and $x_1$ is the inductor current.

2. The system of claim 1, wherein the controller is configured to generate the control signal based on input-output feedback linearization of a set of state variables with stable zero dynamics.

3. The system of claim 1, wherein the controller further comprises:
a summing circuit connected to the output voltage and the reference voltage;
a gain circuit connected to the summing circuit; and,
a modulating circuit connected to the gain circuit and the output voltage, the reference voltage, the input voltage, and the inductor current, to generate the control signal.

4. The system of claim 3, further comprising:
a difference voltage generated by the summing circuit;
an adjusted voltage generated by the gain circuit from the difference voltage and the proportional gain factor; and,
wherein the difference voltage is the difference between the reference voltage and the output voltage.

5. The system of claim 4, wherein the gain circuit further comprises:
a gain controller connected to the summing circuit;
wherein the gain controller is selected from the group consisting of a proportional controller, an integral controller, a derivative controller, and a combination controller comprising any combination of the proportional controller, the integral controller, and the derivative controller; and,
wherein the proportional gain factor is $$\left(k_p + \frac{k_i}{s} + k_d s\right)(y_0 - y),$$

where $k_p$, $k_i$ and $k_d$ are the gains of the proportional, integral, and derivative terms of the gain controller, s is a complex variable, $y_0$ is the reference voltage, and y is the output voltage.

6. The system of claim 5, wherein the voltage converter circuit is a boost converter.

7. The system of claim 6, wherein the boost converter further comprises:

the inductor switchably connected in series with the load resistance and the input voltage; and,
the capacitor connected in parallel with the load resistance.

8. In a system comprising a voltage converter circuit comprising an inductor, and a controller connected to the voltage converter circuit, a method for converting an input voltage to an output voltage comprising the steps of:
receiving a reference voltage;
receiving the input voltage;
receiving an inductor current;
generating a feedback output voltage;
receiving the feedback output voltage;
generating a control signal from the input voltage, the feedback output voltage, the reference voltage, and the inductor current;
applying the control signal to the voltage converter circuit; and,
generating the output voltage based on the control signal;
wherein the step of generating a control signal comprises the steps of calculating a duty cycle and solving $$d = \frac{((RR_cC+L)y - (L-R_sR_cC)Rx_1 - RR_cCu_0 + (R+R_c)LCk(y_0-y))}{R\left(R_cCy - \frac{LR}{R+R_c}x_1\right)},$$

where C is a capacitance value of a capacitor, $R_C$ is a series capacitive resistance of the capacitor, R is a load resistance, L is an inductance value of an inductor, $R_S$ is a series resistance of the inductor, and $u_0$ is the input voltage, and
where $y_0$ is the reference voltage, y is the output voltage, k is a proportional gain factor, and $x_1$ is the inductor current, for the duty cycle.

9. The method of claim 8, further comprising the steps of:
creating a difference voltage from the feedback output voltage and the reference voltage; and,
adjusting the difference voltage by the proportional gain factor to create an adjusted voltage.

10. The method of claim 9, wherein the step of calculating a duty cycle further comprises the step of implementing input-output linearization.

11. The method of claim 9, wherein the step of generating a control signal further comprises the step of creating the control signal based on the output voltage, the reference voltage, the adjusted voltage, the input voltage, and the duty cycle.

12. The method of claim 9, further comprising the step of providing a boost converter for the voltage converter circuit, wherein the boost converter further comprises:
the inductor switchably connected in series with the load resistance and the input voltage; and,
the capacitor connected in parallel with the load resistance.

13. A system for converting an input voltage to an output voltage, comprising:
a voltage converter circuit comprising an inductor, powered by the input voltage and producing an inductor current through the inductor;
a controller connected to the voltage converter circuit, the output voltage, and the input voltage;
a reference voltage connected to the controller;
a control signal generated by the controller for the voltage converter circuit, comprising a duty cycle based on the input voltage, the output voltage, the reference voltage, and the inductor current;

whereby the voltage converter circuit generates the output voltage based on the duty ratio;
wherein the duty cycle is given by $$d = \frac{(RR_cC+L)\dot{y} + (L-R_cR_sC)R x_1 + (R+R_c)LCk(y_0-y)}{R\left(R_cC\dot{y} + \frac{LR}{R+R_c}x_1 - R_cCu_0\right)};$$

wherein C is a capacitance value of a capacitor of the voltage converter circuit, $R_C$ is a series capacitive resistance of the capacitor, R is the load resistance, L is an inductance value of an inductor of the voltage converter circuit, $R_S$ is a series resistance of the inductor, and $u_0$ is the input voltage; and,
wherein $y_0$ is the reference voltage, y is the output voltage, k is a proportional gain factor, and $x_1$ is the inductor current.

14. The system of claim 13, wherein the controller is configured to generate the control signal based on input-output feedback linearization of a set of state variables with stable zero dynamics.

15. The system of claim 13, wherein the controller further comprises:
a summing circuit connected to the output voltage and the reference voltage;
a gain circuit connected to the summing circuit; and,
a modulating circuit connected to the gain circuit and the output voltage, the reference voltage, the input voltage, and the inductor current, to generate the control signal.

16. The system of claim 15, further comprising:
a difference voltage generated by the summing circuit;
an adjusted voltage generated by the gain circuit from the difference voltage and the proportional gain factor; and,
wherein the difference voltage is the difference between the reference voltage and the output voltage.

17. The system of claim 16, wherein the gain circuit further comprises:
a gain controller connected to the summing circuit;
wherein the gain controller is selected from the group consisting of a proportional controller, an integral controller, a derivative controller, and a combination controller comprising any combination of the proportional controller, the integral controller, and the derivative controller; and,
wherein the proportional gain factor is $$\left(k_p + \frac{k_i}{s} + k_d s\right)(y_0 - y),$$

where $k_p$, $k_i$ and $k_d$ are the gains of the proportional, integral, and derivative terms of the gain controller, s is a complex variable, $y_0$ is the reference voltage, and y is the output voltage.

18. The system of claim 17, wherein the voltage converter circuit is a buck-boost converter.

19. The system of claim 18, wherein the buck-boost converter further comprises:

the inductor switchably connected in series with a load resistance;
the input voltage switchably connected in parallel with the inductor; and,
the capacitor connected in parallel with the load resistance.

20. In a system comprising a voltage converter circuit comprising an inductor, and a controller connected to the voltage converter circuit, a method for converting an input voltage to an output voltage comprising the steps of:
receiving a reference voltage;
receiving the input voltage;
receiving an inductor current;
generating a feedback output voltage;
receiving the feedback output voltage;
generating a control signal from the input voltage, the feedback output voltage, the reference voltage, and the inductor current;
applying the control signal to the voltage converter circuit; and,
generating the output voltage based on the control signal;
wherein the step of generating a control signal comprises the steps of calculating a duty cycle and solving $$d = \frac{(RR_cC+L)\dot{y} + (L-R_cR_sC)R x_1 + (R+R_c)LCk(y_0-y)}{R\left(R_cC\dot{y} + \frac{LR}{R+R_c}x_1 - R_cCu_0\right)},$$

where C is a capacitance value of a capacitor, $R_C$ is a series capacitive resistance of the capacitor, R is the load resistance, L is an inductance value of an inductor, $R_S$ is a series resistance of the inductor, and $u_0$ is the input voltage, and
where $y_0$ is the reference voltage, y is the output voltage, k is a proportional gain factor, and $x_1$ is the inductor current, for the duty cycle.

21. The method of claim 20, further comprising the steps of:
creating a difference voltage from the feedback output voltage and the reference voltage; and,
adjusting the difference voltage by the proportional gain factor to create an adjusted voltage.

22. The method of claim 21, wherein the step of calculating a duty cycle further comprises the step of implementing input-output linearization.

23. The method of claim 21, wherein the step of generating a control signal further comprises the step of creating the control signal based on the output voltage, the reference voltage, the adjusted voltage, the input voltage, and the duty cycle.

24. The method of claim 21, further comprising the step of providing a buck-boost converter for the voltage converter circuit, wherein the buck-boost converter further comprises:
the inductor switchably connected in series with the load resistance;
the input voltage switchably connected in parallel with the inductor; and,
the capacitor connected in parallel with the load resistance.

\* \* \* \* \*